United States Patent
Ong et al.

(10) Patent No.: US 10,365,905 B1
(45) Date of Patent: Jul. 30, 2019

(54) SYSTEMS AND METHODS FOR EVALUATING APPLICATION PERFORMANCE CHANGES VIA COMPARATIVE CALL GRAPHS

(71) Applicant: Facebook, Inc., Menlo Park, CA (US)

(72) Inventors: Kian Win Ong, Redwood City, CA (US); Helga Gudmundsdottir, Menlo Park, CA (US); Benjamin D. Maurer, San Francisco, CA (US); David McCabe, Seattle, WA (US); Douglas Armstrong, Kirkland, WA (US); Kevin Casey, San Jose, CA (US); Luis Miguel Fonseca dos Reis, Cupertino, CA (US); Paul Van Slembrouck, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/962,530

(22) Filed: Apr. 25, 2018

Related U.S. Application Data

(60) Provisional application No. 62/577,428, filed on Oct. 26, 2017.

(51) Int. Cl.
  *G06F 8/41*   (2018.01)
  *G06F 16/901*  (2019.01)
(52) U.S. Cl.
  CPC .............. *G06F 8/443* (2013.01); *G06F 8/433* (2013.01); *G06F 16/9024* (2019.01)
(58) Field of Classification Search
  None
  See application file for complete search history.

(56) References Cited

U.S. PATENT DOCUMENTS

| | | | |
|---|---|---|---|
| 6,857,120 B1* | 2/2005 | Arnold | G06F 9/4484 717/157 |
| 9,367,809 B2* | 6/2016 | Puri | G06N 5/04 |

(Continued)

OTHER PUBLICATIONS

Android systrace. https://developer.android.com/studio/profile/systrace commandline.html, visited Aug. 15, 2017.

(Continued)

*Primary Examiner* — Isaac T Tecklu
(74) *Attorney, Agent, or Firm* — FisherBroyles, LLP

(57) ABSTRACT

The disclosed computer-implemented method may include (1) receiving a set of control performance values and a set of modified performance values, (2) determining a set of comparative performance values based on the set of control performance values and the set of modified performance values, (3) generating a call graph based on the set of comparative performance values, the call graph including a set of nodes, each node corresponding to a function, the function corresponding to a particular comparative performance value included in the set of comparative performance values, and (b) a set of edges connecting the nodes based on relationships between the nodes, (4) weighting each node in accordance with the comparative performance value corresponding to the node, and (5) displaying the call graph via a user interface in accordance with the weighting of each node. Various other methods, systems, and computer-readable media are also disclosed.

20 Claims, 12 Drawing Sheets

(56) References Cited

U.S. PATENT DOCUMENTS

| | | | | |
|---|---|---|---|---|
| 2005/0097533 | A1* | 5/2005 | Chakrabarti | G06F 8/433 717/144 |
| 2009/0328002 | A1* | 12/2009 | Lin | G06F 11/3604 717/120 |
| 2010/0083240 | A1* | 4/2010 | Siman | G06F 8/433 717/144 |
| 2011/0258617 | A1* | 10/2011 | Park | G06F 11/3612 717/157 |
| 2011/0321021 | A1* | 12/2011 | Chen | G06F 8/4442 717/157 |
| 2012/0278793 | A1* | 11/2012 | Jalan | G06F 11/3419 717/158 |
| 2013/0066933 | A1* | 3/2013 | Mendiratta | G06Q 30/0201 708/208 |
| 2013/0174127 | A1* | 7/2013 | Chen | G06F 11/3466 717/133 |
| 2013/0249917 | A1* | 9/2013 | Fanning | G06T 11/206 345/440 |
| 2016/0226736 | A1* | 8/2016 | Tran | G06F 17/30958 |
| 2017/0068581 | A1* | 3/2017 | Qi | G06F 11/079 |

OTHER PUBLICATIONS

C. Brewer; Diverging Color Schemes; http://www.personal.psu.edu/cab38/ColorSch/SchHTMLs/CBColorDiv.html; as accessed on Jan. 1, 2018.

F. Eichinger, K. Bohm, and M. Huber; Mining Edge-Weighted Call Graphs to Localise Software Bugs; pp. 333-348; Springer Berlin Heidelberg, Berlin, Heidelberg, 2008.

K. C. Foo, Z. M. J. Jiang, B. Adams, A. E. Hassan, Y. Zou, and P. Flora; An industrial case study on the automated detection of performance regressions in heterogeneous environments; In Proceedings of the 37th International Conference on Software Engineering—vol. 2, ICSE '15, pp. 159-168; Piscataway, NJ, USA, 2015; IEEE Press.

M. Attariyan, M. Chow, and J. Flinn; X-ray: Automating root-cause diagnosis of performance anomalies in production software. 10th USENIX Symposium on Operating Systems Design and Implementation (OSDI '12); pp. 307-320; Hollywood, CA, 2012; USENIX Association.

O. Lhoták; Comparing call graphs; In Proceedings of the 7th ACM SIGPLAN-SIGSOFT Workshop on Program Analysis for Software Tools and Engineering, PASTE '07, pp. 37-42, New York, NY, USA, 2007; ACM.

R. R. Sambasivan, A. X. Zheng, M. De Rosa, E Krevat, S. Whitman, M. Stroucken, W. Wang, L. Xu, and G. R. Ganger; Diagnosing performance changes by comparing request flows; In NSDI, pp. 43-56, 2011.

S. L. Graham, P. B. Kessler, and M. K. McKusick; Gprof: A call graph execution profiler; SIGPLAN Not., 39(4):49-57, Apr. 2004.

S. Rostedt; Finding origins of latencies using ftrace. In /11th Real-Time Linux Workshop/, pp. 128-130, 2009; available at https://static.lwn.net/images/conf/rtlws11/papers/proceedings_2009.pdf.

Wikipedia; Call Graph; available at https://en.wikipedia.org/w/index.php?title=Call_graph&oldid=814886393; as accessed on Dec. 31, 2017.

Wikipedia; Directed Graph; available at https://en.wikipedia.org/w/index.php?title=Directed_graph&oldid=815863027; as accessed on Dec. 31, 2017.

* cited by examiner

FIG. 4A  FIG. 4B

SYSTEMS AND METHODS FOR EVALUATING APPLICATION PERFORMANCE CHANGES VIA COMPARATIVE CALL GRAPHS

CROSS REFERENCE TO RELATED APPLICATION

This application claims the benefit of U.S. Provisional Application No. 62/577,428, filed Oct. 26, 2017, the disclosure of which is incorporated, in its entirety, by this reference.

BACKGROUND

Performance regressions may routinely occur in large, complex applications and systems. Preventing, identifying, and remediating performance regressions may be a critical concern for application developers. Some performance regressions, such as increased usage of computing resources (e.g., processing resources, network resources, memory resources, storage resources, etc.), can affect operational costs. Additionally, some performance regressions, such as increased latency of an application (e.g., an increased start-up time, a decrease in responsiveness to user input, etc.) can degrade user experiences.

However, pinpointing root causes of performance regressions may be an arduous task, compounded by the scale and complexity of modern applications and computing systems. For example, consider preventing the start-up latency of an ANDROID application from exceeding 10 seconds. A performance regression may occur due to any of a number of factors including, but not limited to, (1) source code changes, (2) gradual roll-outs of new features, and/or (3) A/B tests of experimental features.

A complicating factor may be that a performance regression in one portion of an application may be masked by a performance improvement in another portion of the application. Another complicating factor may be that hardware and software systems that execute the application may be heterogeneous, with vastly different performance characteristics. For example, there are over 1,000 different mobile devices that run the ANDROID operating system (OS), with four major OS versions and JAVA virtual machines (JVMs). Additionally, many applications may utilize various back-end services as part of large-scale distributed systems, which may increase the difficulty of pinpointing root causes of performance regressions within and/or attributable to the applications themselves.

The instant disclosure, therefore, identifies and addresses a need for improved systems and methods for evaluating application performance to identify and determine root causes of performance regressions.

SUMMARY

As will be described in greater detail below, the instant disclosure describes various systems and methods for evaluating application performance changes via comparative call graphs. An example system may generate a call graph based on a set of determined comparative performance values, each comparative performance value in the set of comparative performance values representative of a variation in performance of a function during an execution of an evaluation operation by a control version of a program and an execution of the evaluation operation by a modified version of the program. The example system may also weight (e.g., via a diverging color scheme) each node in the call graph in accordance with the comparative performance value of the function corresponding to the node, and may display the call graph via a user interface in accordance with the weighting of each node. Thus, a developer may be able to use the weighted comparative call graph to visually identify functions and/or groups of functions that may include possible performance regressions.

In one example, a computer-implemented method for evaluating application performance changes via comparative call graphs may include receiving (1) a set of control performance values, each control performance value in the set of control performance values corresponding to a function called during an execution of an evaluation operation by a control version of a program, and (2) a set of modified performance values, each modified performance value in the set of modified performance values corresponding to a function called during an execution of an evaluation operation by a modified version of a program. The method may further include determining a set of comparative performance values based on the set of control performance values and the set of modified performance values. Each comparative performance value in the set of comparative performance values may be representative of a variation in performance of a function during the execution of the evaluation operation by the control version of the program and the execution of the evaluation operation by the modified version of the program.

In some examples, the method may further include generating a call graph based on the set of comparative performance values. The call graph may include (1) a set of nodes, each node in the set of nodes corresponding to a function, the function corresponding to a particular comparative performance value included in the set of comparative performance values, and (2) a set of edges, each edge in the set of edges directed from a node in the set of nodes corresponding to a caller function to a node in the set of nodes corresponding to a callee function called by the caller function. The method may further include weighting each node in the set of nodes in accordance with the comparative performance value corresponding to the node, and displaying the call graph via a user interface in accordance with the weighting of each node in the set of nodes.

In some embodiments, weighting each node in the set of nodes in accordance with the comparative performance value corresponding to the node may include (1) establishing a diverging color scheme based on a midpoint comparative performance value, and (2) for each node in the set of nodes, assigning a display color included in the diverging color scheme to the node such that the display color assigned to the node reflects a relationship between the comparative performance value corresponding to the node and the midpoint comparative performance value. In some additional embodiments, the midpoint comparative performance value may represent a comparative performance value having less than a predetermined maximum threshold value and greater than a predetermined minimum threshold value.

In at least one embodiment, the method may further include, for each edge in the set of edges, determining a proportional performance value associated with a proportion of the comparative performance value associated with the node of the caller function attributable to the callee function. In some examples, the method may further include weighting each edge in the set of edges in accordance with the proportional performance value of the edge. In some examples, displaying the call graph via the user interface may further include displaying the call graph via the user interface in accordance with the weighting of each edge in the set of edges.

In some examples, the method may further include (1) receiving a direction to update the call graph in accordance with a call graph operation, and (2) updating the call graph in accordance with the call graph operation. In at least one example, the call graph operation may include a hide operation, the direction to update the call graph may include a selection of at least one node included in the displayed call graph, and updating the call graph may include removing the at least one node from the displayed call graph.

In at least one example, the call graph operation may include a remove operation, the direction to update the call graph may include a selection of at least one node included in the displayed call graph, and updating the call graph may include (1) removing the at least one node from the set of nodes, and (2) updating the comparative performance values corresponding to the nodes in the set of nodes and the edge in the set of edges based on removing the at least one node from the set of nodes.

In some embodiments, the call graph operation may include a focus operation, and the direction to update the call graph may include (1) a selection of at least one node included in the displayed call graph, and (2) a length of a path from the selected node. In such embodiments, updating the call graph may include determining a reachable subset of nodes, the reachable subset of nodes including a subset of the set of nodes that are reachable from the selected node within the length of the path, and an unreachable subset of nodes, the unreachable subset including a subset of the set of nodes that are not reachable from the selected node within the length of the path. In some embodiments, updating the call graph operation may further include removing the nodes included in the unreachable subset of nodes from the displayed call graph.

In some examples, the call graph operation may include a merge operation, the direction to update the call graph may include a selection of at least two nodes included in the set of nodes, and updating the call graph may include replacing the at least two nodes with a merged node. In some such examples, replacing the two nodes with the merged node may include (1) determining a merged comparative performance value based on the comparative performance values corresponding to the at least two nodes, (2) designating the determined merged comparative performance value as the comparative performance value corresponding to the merged node, (3) removing the at least two nodes from the set of nodes, (4) including the merged node in the set of nodes, and (5) updating the comparative performance values corresponding to each node included in the set of nodes and the set of edges based on removing the at least two nodes from the set of nodes and including the merged node in the set of nodes.

In some embodiments, displaying the call graph further may further include (1) receiving a direction to identify at least one node included in the set of nodes that corresponds to a function that has a predefined attribute, (2) identifying at least one node included in the set of nodes that corresponds to a function that has the predefined attribute, and (3) annotating the identified at least one node to indicate that the identified at least one node corresponds to a function that has the predefined attribute. In some such embodiments, the predefined attribute may include an indication that the modified version of the program includes a modification to the function that is omitted from the control version of the program. In at least one embodiment, the method may further include (1) receiving a direction to view information associated with the modification, and (2) displaying information regarding the modification via the user interface.

In addition, a corresponding system for evaluating application performance changes via comparative call graphs may include several modules, stored in memory, including a receiving module that receives (1) a set of control performance values, each control performance value in the set of control performance values corresponding to a function called during an execution of an evaluation operation by a control version of a program, and (2) a set of modified performance values, each modified performance value in the set of modified performance values corresponding to a function called during an execution of an evaluation operation by a modified version of a program. In some embodiments, the system may further include a determining module that determines a set of comparative performance values based on the set of control performance values and the set of modified performance values, each comparative performance value in the set of comparative performance values representative of a variation in performance of a function during the execution of the evaluation operation by the control version of the program and the execution of the evaluation operation by the modified version of the program.

In some embodiments, the system may further include a generating module that generates a call graph based on the set of comparative performance values, the call graph including (1) a set of nodes, each node in the set of nodes corresponding to a function, the function corresponding to a particular comparative performance value included in the set of comparative performance values, and (2) a set of edges, each edge in the set of edges directed from a node in the set of nodes corresponding to a caller function to a node in the set of nodes corresponding to a callee function called by the caller function. In some examples, the system may further include a weighting module that weights each node in the set of nodes in accordance with the comparative performance value corresponding to the node, and a displaying module that displays the call graph via a user interface in accordance with the weighting of each node in the set of nodes. The system may further include at least one physical processor that executes the receiving module, the determining module, the generating module, the weighting module, and the displaying module.

In some examples, the weighting module may weight each node in the set of nodes in accordance with the comparative performance value by (1) establishing a diverging color scheme based on a midpoint comparative performance value, and (2) for each node in the set of nodes, assigning a display color included in the diverging color scheme to the node such that the display color assigned to the node reflects a relationship between the comparative performance value corresponding to the node and the midpoint comparative performance value.

In some embodiments, the receiving module may further receive a direction to update the call graph in accordance with a call graph operation. In such embodiments, the system may further include an updating module, stored in memory, that may update the call graph in accordance with the call graph operation. In such embodiments, the physical processor may further execute the updating module.

In at least one embodiment, the call graph operation may include at least one of (1) a hide operation, and (2) a remove operation. In such embodiments, the direction to update the call graph may include a selection of at least one node included in the displayed call graph, and (3) when the call graph operation includes the hide operation, the updating module may update the call graph by removing the at least one node from the displayed call graph, and (4) when the call graph operation includes the remove operation, the updating module may update the call graph by removing the at least one node from the set of nodes, and updating the comparative performance values corresponding to the nodes in the set of nodes and the edges in the set of edges based on removing the at least one node from the set of nodes.

In some examples, the call graph operation may include a focus operation and the direction to update the call graph may include (1) a selection of at least one node included in the displayed call graph, and (2) a length of a path from the selected node. In such examples, the updating module may update the call graph by determining (1) a reachable subset of nodes, the reachable subset of nodes including a subset of the set of nodes that are reachable from the selected node within the length of the path, and (2) an unreachable subset of nodes, the unreachable subset including a subset of the set of nodes that are not reachable from the selected node within the length of the path. The updating module may further update the call graph by removing the nodes included in the unreachable subset of nodes from the displayed call graph.

In some embodiments, the call graph operation may include a merge operation and the direction to update the call graph may include a selection of at least two nodes included in the set of nodes. In such embodiments, the updating module may update the call graph by (1) determining a merged comparative performance value based on the comparative performance values corresponding to the at least two nodes, (2) designating the determined merged comparative performance value as the comparative performance value corresponding to the merged node, (3) removing the at least two nodes from the set of nodes, (4) including the merged node in the set of nodes, and (5) updating the comparative performance values corresponding to each node included in the set of nodes and the set of edges based on removing the at least two nodes from the set of nodes and including the merged node in the set of nodes.

In some examples, the above-described method may be encoded as computer-readable instructions on a computer-readable medium. For example, a computer-readable medium may include one or more computer-executable instructions that, when executed by at least one processor of a computing device, may cause the computing device to receive (1) a set of control performance values, each control performance value in the set of control performance values corresponding to a function called during an execution of an evaluation operation by a control version of a program, and (2) a set of modified performance values, each modified performance value in the set of modified performance values corresponding to a function called during an execution of an evaluation operation by a modified version of a program. The computer-readable medium may further include one or more computer-executable instructions that, when executed by the at least one processor of the computing device, may cause the computing device to determine a set of comparative performance values based on the set of control performance values and the set of modified performance values, each comparative performance value in the set of comparative performance values representative of a variation in performance of a function during the execution of the evaluation operation by the control version of the program and the execution of the evaluation operation by the modified version of the program.

In some examples, the computer-readable medium may further include one or more computer-executable instructions that, when executed by the at least one processor of the computing device, may cause the computing device to generate a call graph based on the set of comparative performance values, the call graph including (1) a set of nodes, each node in the set of nodes corresponding to a function, the function corresponding to a particular comparative performance value included in the set of comparative performance values, and (2) a set of edges, each edge in the set of edges directed from a node in the set of nodes corresponding to a caller function to a node in the set of nodes corresponding to a callee function called by the caller function.

In some embodiments, the computer-readable medium may further include one or more computer-executable instructions that, when executed by the at least one processor of the computing device, may cause the computing device to weight each node in the set of nodes in accordance with the comparative performance value corresponding to the node, and may cause the computing device to display the call graph via a user interface in accordance with the weighting of each node in the set of nodes.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIGS. 4A-4C illustrate displaying a weighted comparative call graph generated from a set of comparative performance values.

Figure 1:
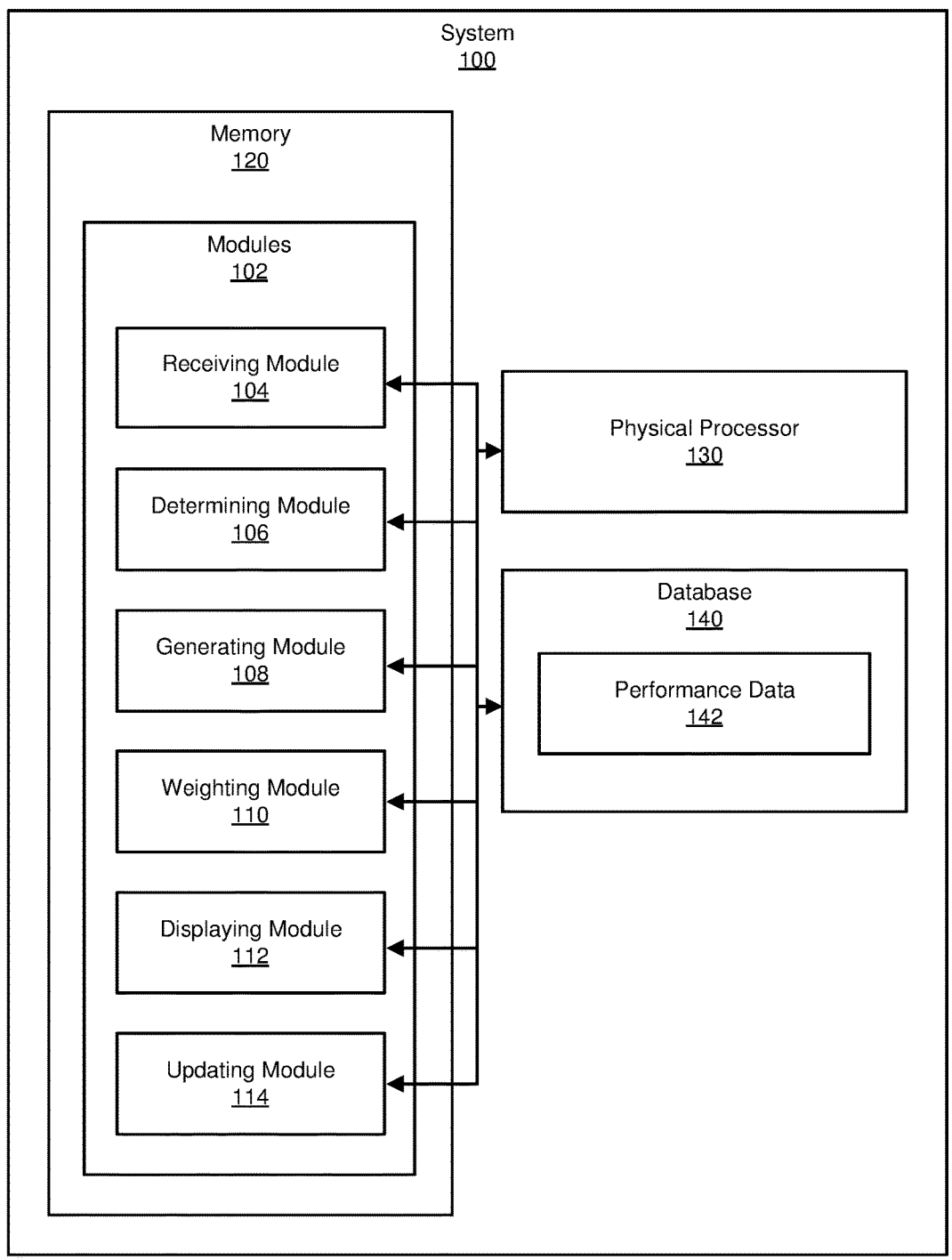
FIG. 1 is a block diagram of an example system for evaluating application performance changes via comparative call graphs.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for evaluating application performance changes via comparative call graphs. As will be explained in greater detail below, embodiments of the instant disclosure may receive (1) a set of control performance values corresponding to functions called during an execution of an evaluation operation by a control version of a program, and (2) a set of modified performance values corresponding to functions called during an execution of the evaluation operation by a modified version of the program. Embodiments of the instant disclosure may then determine a set of comparative performance values based on the two sets of performance values, the comparative performance values representative of variations in performance of functions during the execution of the evaluation operation by the control version of the program and the execution of the evaluation operation by the modified version of the program.

In at least one embodiment, an example system may then generate a call graph based on the set of comparative performance values. The call graph may include a set of nodes, each node corresponding to a function, the function corresponding to a particular comparative performance value. The call graph may also include a set of edges, where each edge is directed from a node corresponding to a "caller" function to a node corresponding to a "callee" function called by the caller function. The example system may then weight each node in accordance with the comparative performance value corresponding to the function, such as by assigning a color to the node in accordance with a diverging color scheme, where nodes representative of larger variations in performance may be more deeply and/or darkly colored than nodes representative of functions having smaller variations in performance.

The example system may then display the call graph via a user interface in accordance with the weighting of each node in the set of nodes. Thus, a user viewing the call graph may quickly identify nodes and/or groupings of nodes that represent functions that may have increased or decreased in performance between the two versions. This may allow the user to quickly identify functions that may have introduced performance regressions into the application. Embodiments of the instant disclosure may also utilize various techniques to narrow down a large number of nodes and edges to a manageable set that a user may interactively analyze and/or explore. Additionally, embodiments of the present disclosure may also provide additional information to the user that may aid in identifying root causes of performance regressions.

Thus, the systems and methods described herein may allow users (e.g., developers) to effectively visualize function-level changes in performance in even very large and/or complex applications. Additionally, embodiments of the systems and methods described herein may further facilitate identification and remediation of root causes of performance regressions, thus improving the functioning of one or more computer systems. Embodiments of the instant disclosure may also provide various other advantages and features, as discussed in greater detail below.

The following will provide, with reference to FIGS. 1-2 and 4-12, detailed descriptions of systems for evaluating application performance changes via comparative call graphs. Detailed descriptions of corresponding computer-implemented methods will also be provided in connection with FIG. 3.

FIG. 1 is a block diagram of an example system 100 for evaluating application performance changes via comparative call graphs. As illustrated in this figure, example system 100 may include one or more modules 102 for performing one or more tasks. As will be explained in greater detail below, modules 102 may include a receiving module 104 that receives (1) a set of control performance values, each control performance value in the set of control performance values corresponding to a function called during an execution of an evaluation operation by a control version of a program, and (2) a set of modified performance values, each modified performance value in the set of modified performance values corresponding to a function called during an execution of an evaluation operation by a modified version of a program.

Example system 100 may further include a determining module 106 that determines a set of comparative performance values based on the set of control performance values and the set of modified performance values, each comparative performance value in the set of comparative performance values representative of a variation in performance of a function during the execution of the evaluation operation by the control version of the program and the execution of the evaluation operation by the modified version of the program. Example system 100 may further include a generating module 108 that generates a call graph based on the set of comparative performance values, the call graph including (1) a set of nodes, each node in the set of nodes corresponding to a function, the function corresponding to a particular comparative performance value included in the set of comparative performance values, and (2) a set of edges, each edge in the set of edges directed from a node in the set of nodes corresponding to a caller function to a node in the set of nodes corresponding to a callee function called by the caller function.

In some embodiments, example system 100 may further include a weighting module 110 that weights each node in the set of nodes in accordance with the comparative performance value corresponding to the node, and a displaying module 112 that displays the call graph via a user interface in accordance with the weighting of each node in the set of nodes. In at least one embodiment, example system 100 may further include an updating module 114 that may update the call graph in accordance with one or more call graph operations.

As further illustrated in FIG. 1, example system 100 may also include one or more memory devices, such as memory 120. Memory 120 generally represents any type or form of volatile or non-volatile storage device or medium capable of storing data and/or computer-readable instructions. In one example, memory 120 may store, load, and/or maintain one or more of modules 102. Examples of memory 120 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As further illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 120. Additionally or alternatively, physical processor 130 may execute one or more of modules 102 to facilitate evaluating application performance changes via comparative call graphs. Examples of physical processor 130 include, without limitation, microprocessors, microcontrollers, central processing units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As also illustrated in FIG. 1, exemplary system 100 may also include one or more databases, such as database 140. In at least one example, database 140 may include performance data 142 for storing information about performance of a program. Database 140 may represent portions of a single database or computing device or a plurality of databases or computing devices. In some embodiments, database 140 may be a logical container for data and may be implemented in various forms (e.g., a database, a file, a data structure, etc.). Examples of database 140 may include databases or database management systems such as SCUBA from FACEBOOK of Menlo Park, Calif., APACHE HIVE, an operational data store (ODS), a relational database, a NoSQL database, a NewSQL database, and/or any other suitable organized collection of data.

Figure 2:
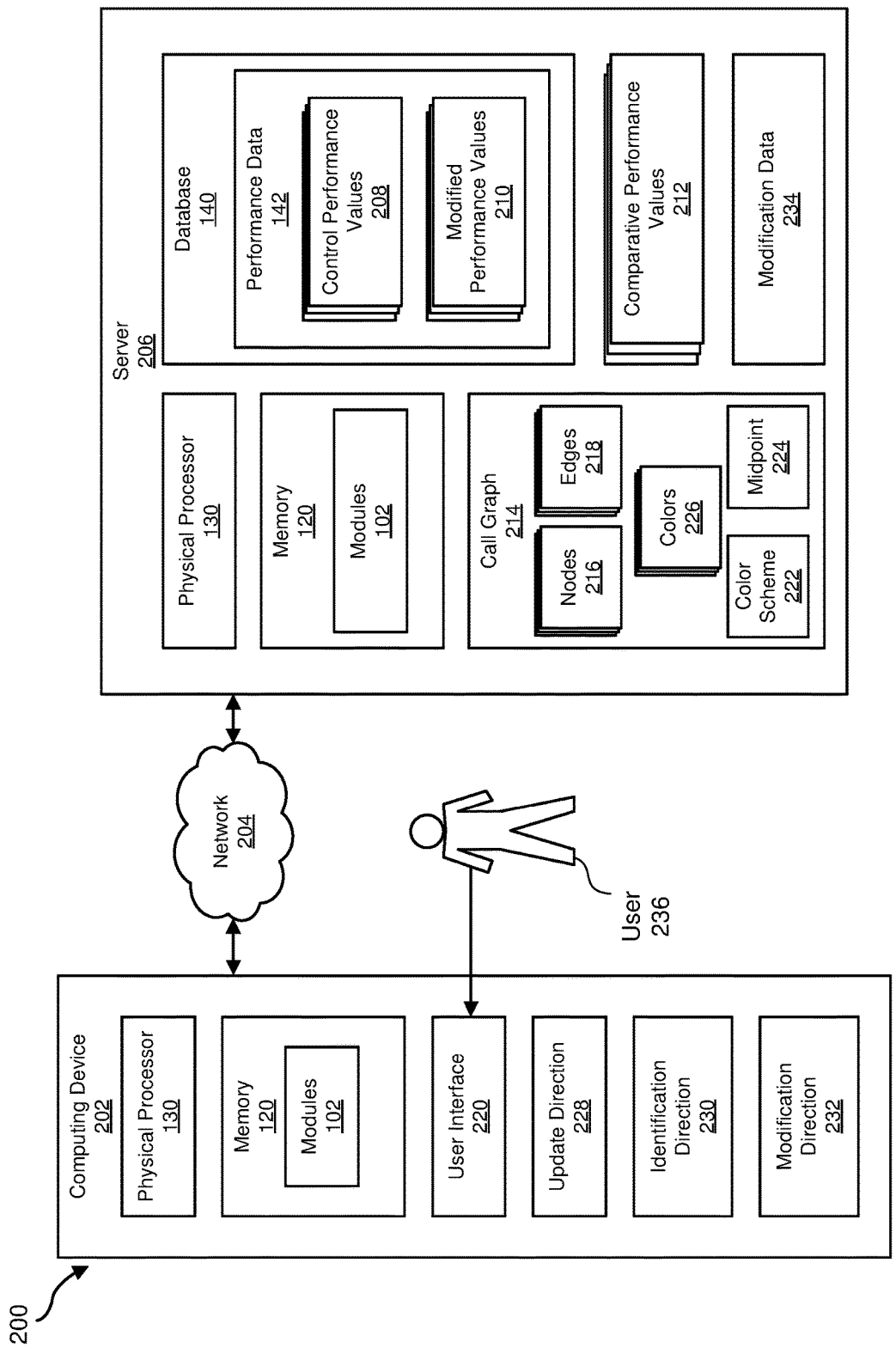
FIG. 2 is a block diagram of an example implementation of a system for evaluating application performance changes via comparative call graphs.

Example system 100 in FIG. 1 may be implemented in a variety of ways. For example, all or a portion of example system 100 may represent portions of an example system 200 ("system 200") in FIG. 2. As shown in FIG. 2, system 200 may include computing device 202 in communication with server 206 via network 204. In at least one example, computing device 202 may be programmed with one or more of modules 102. Additionally or alternatively, server 206 may be programmed with one or more of modules 102.

In at least one embodiment, one or more modules 102 from FIG. 1 may, when executed by computing device 202 and/or server 206, enable computing device 202 and/or server 206 to perform one or more operations to evaluate application performance changes via comparative call graphs. For example, as will be described in greater detail below, receiving module 104 may cause computing device 202 and/or server 206 to receive (1) a set of control performance values (e.g., control performance values 208), each control performance value in the set of control performance values corresponding to a function called during an execution of an evaluation operation by a control version of a program, and (2) a set of modified performance values (e.g., modified performance values 210), each modified performance value in the set of modified performance values corresponding to a function called during an execution of an evaluation operation by a modified version of a program.

Additionally, determining module 106 may cause computing device 202 and/or server 206 to determine a set of comparative performance values (e.g., comparative performance values 212) based on the set of control performance values and the set of modified performance values, each comparative performance value in the set of comparative performance values representative of a variation in performance of a function during the execution of the evaluation operation by the control version of the program and the execution of the evaluation operation by the modified version of the program. Additionally, generating module 108 may cause computing device 202 and/or server 206 to generate a call graph (e.g., call graph 214) based on the set of comparative performance values, the call graph including (1) a set of nodes (e.g., nodes 216), each node in the set of nodes corresponding to a function, the function corresponding to a particular comparative performance value included in the set of comparative performance values (e.g., comparative performance values 212), and (2) a set of edges (e.g., edges 218), each edge in the set of edges directed from a node in the set of nodes corresponding to a caller function to a node in the set of nodes corresponding to a callee function called by the caller function.

Additionally, in some examples, weighting module 110 may cause computing device 202 and/or server 206 to weight each node in the set of nodes (e.g., each node in nodes 216) in accordance with the comparative performance value corresponding to the node, and displaying module 112 may cause computing device 202 and/or server 206 to display the call graph via a user interface (e.g., user interface 220) in accordance with the weighting of each node in the set of nodes.

In some examples, weighting module 110 may weight each node in the set of nodes in accordance with the comparative performance value corresponding to the node by (1) establishing a diverging color scheme (e.g., color scheme 222) based on a midpoint comparative performance value (e.g., midpoint 224), and (2) for each node in the set of nodes, assigning a display color (e.g., one of colors 226) included in the diverging color scheme to the node such that the display color assigned to the node reflects a relationship between the comparative performance value corresponding to the node and the midpoint comparative performance value.

Additionally, in some embodiments, weighting module 110 may weight each edge in the set of edges by (1) determining a proportional performance value associated with a proportion of the comparative performance value associated with the node of the caller function attributable to the callee function, and (2) weighting each edge in the set of edges in accordance with the weighting of each edge in the set of edges. In some embodiments, displaying module 112 may display the call graph via the user interface by displaying the call graph via the user interface in accordance with the weighting of each edge in the set of edges.

In some examples, receiving module 104 may receive a direction to update the call graph (e.g., update direction 228) in accordance with a call graph operation, and updating module 114 may update the call graph in accordance with the call graph operation.

In some examples, displaying module 112 may display the call graph by receiving a direction to identify at least one node included in the set of nodes that corresponds to a function that has a predefined attribute (identification direction 230), identifying at least one node included in the set of nodes that corresponds to a function that has the predefined attribute, annotating the identified node to indicate that the identified node corresponds to a function that has the predefined attribute.

In some examples, the predefined attribute may include an indication that a modification was applied to the function between the execution of the evaluation operation by the control version of the program and the execution of the evaluation operation by the modified version of the program. In such examples, receiving module 104 may receive a user direction (e.g., modification direction 232) to view information associated with the modification (e.g., modification data 234), and displaying module 112 may display information regarding the modification via the user interface (e.g., user interface 220). In some examples, a user (e.g., user 236) may provide one or more of the direction to update the call graph (e.g., update direction 228), the direction to identify a node that has a predefined attribute (e.g., identification direction 230), and/or the direction to view information associated with a modification (e.g., modification direction 232) via a user interface (e.g., user interface 220).

Computing device 202 generally represents any type or form of computing device capable of reading and/or executing computer-executable instructions. In at least one embodiment, computing device 202 may accept one or more directions from server 206 (e.g., from one or more of modules 102 executed by server 206). Examples of computing device 202 include, without limitation, servers, laptops, tablets, cellular phones, (e.g., smartphones), personal digital assistants (PDAs), multimedia players, embedded systems, wearable devices (e.g., smart watches, smart glasses, etc.), gaming consoles, combinations of one or more of the same, or any other suitable mobile computing device. In at least one example, computing device 202 may present a call graph to an end user (e.g., end user 2xx), and or may receive one or more directions from the end user.

Network 204 generally represents any medium or architecture capable of facilitating communication and/or data transfer between computing device 202 and/or server 206. Examples of network 204 include, without limitation, an intranet, a WAN, a LAN, a Personal Area Network (PAN), the Internet, Power Line Communications (PLC), a cellular network (e.g., a Global System for Mobile Communications (GSM) network, a code-division multiple access (CDMA) network, a Long-Term Evolution (LTE) network, etc.), and the like. Network 204 may facilitate communication or data transfer using wireless or wired connections. In one embodiment, network 204 may facilitate communication between computing device 202 and server 206.

Server 206 generally represents any type or form of computing device capable of reading and/or executing computer-executable instructions and/or hosting executables. Examples of server 206 include, without limitation, application servers, storage servers, database servers, web servers, and/or any other suitable computing device configured to run certain software applications and/or provide various application, storage, and/or database services.

In at least one example, computing device 202 and/or server 206 may be computing devices programmed with one or more of modules 102. All or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, may enable computing device 202 and/or server 206 to evaluate application performance changes via comparative call graphs.

Many other devices or subsystems may be connected to system 100 in FIG. 1 and/or system 200 in FIG. 2. Conversely, all of the components and devices illustrated in FIGS. 1 and 2 need not be present to practice the embodiments described and/or illustrated herein. The devices and subsystems referenced above may also be interconnected in different ways from those shown in FIG. 2. Systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

Figure 3:
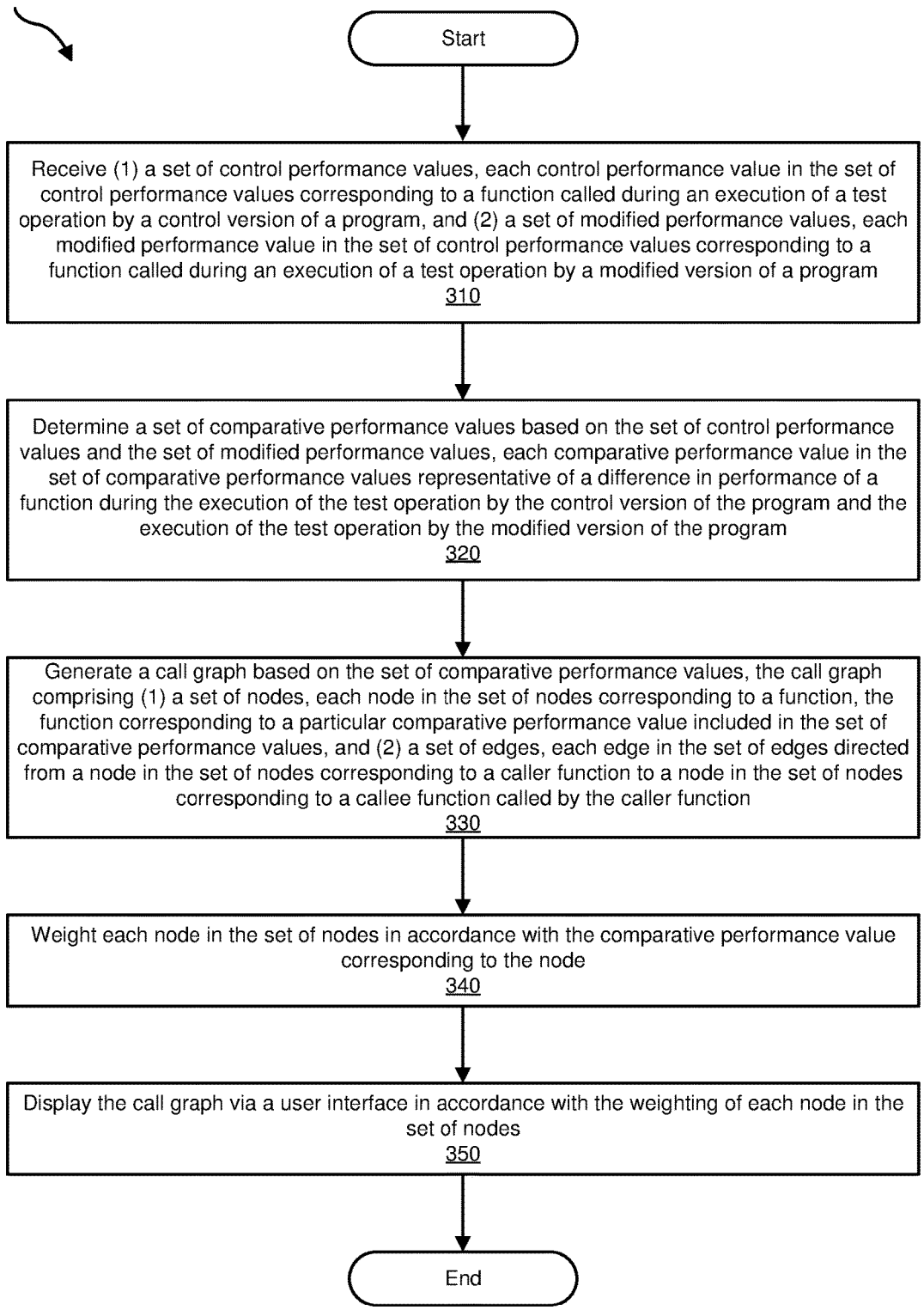
FIG. 3 is a flow diagram of an example method for evaluating application performance changes via comparative call graphs.

FIG. 3 is a flow diagram of an example computer-implemented method 300 for evaluating application performance changes via comparative call graphs. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310, one or more of the systems described herein may receive (1) a set of control performance values, each control performance value in the set of control performance values corresponding to a function called during an execution of an evaluation operation by a control version of a program, and (2) a set of modified performance values, each modified performance value in the set of modified performance values corresponding to a function called during an execution of an evaluation operation by a modified version of a program; define a topology of a data center network that defines an arrangement of a plurality of networking devices included in the data center network. For example, receiving module 104 may, as part of computing device 202 and/or server 206 in FIG. 2, cause computing device 202 and/or server 206 to receive (1) control performance values 208 and (2) modified performance values 210.

In at least some examples, a "function" may include any set of computer-executable instructions. In some embodiments, a function may be represented by a segment of computer code included as part of a program. In some examples, a "performance value" may be any quantifiable measurement of performance of at least a portion of a program (e.g., a function, a class, a data object, a subroutine, etc.). Suitable performance values may include, but are not limited to, an inclusive time of a function, an exclusive time of a function, a total execution time of a function, an instruction count associated with execution of a function, a memory footprint (e.g., amount of memory used by the function during execution of an evaluation operation), CPU usage, network resource usage, network traffic sent and received, average response time, error rate, network request rate, garbage collection metrics, time to load dependencies (e.g., shared objects, libraries, etc.), server response time, thread priority inversions, time spent in lock contention, latency, frame rendering time, dropped frames, efficiency (e.g., a number of users supported by a portion of a program, a server, etc.), throughput (e.g., an amount of data passing through a system, process, function, etc.), a reliability metric (e.g., a number of occurrences of a program ceasing to function properly and/or closing unexpectedly), and so forth.

In some examples, an "inclusive time" of a function may include an estimated time spent executing the function and any callee functions (e.g., functions called by the function). In further examples, an "exclusive time" of a function may include an estimated time spent executing the function excluding time spent executing any callee functions.

In at least some embodiments, an "evaluation operation" may include any operation or set of operations that may be executed by a program in order to evaluate performance of at least a portion of the program. For example, an evaluation operation may execute various functions within a program in order to evaluate performance of the executed functions. Additionally, an evaluation operation may execute a high-level operation of a program in order to evaluate performance of lower-level functions that support execution of the high-level operation. By way of example, an evaluation operation may be a cold start of a program, a set of tests designed to engage portions (e.g., functions) of the program, a set of predetermined calls of functions included in the program, and so forth. Additional examples of test operations may include, without limitation, simulated or actual user interaction with at least a portion of a user interface (e.g., a user clicking a button, a user scrolling a window, etc.) of the program and/or sampled executions of the program. By executing an evaluation operation, a suitable data collection system may collect performance values associated with functions included in a particular version of a program.

For example, a suitable performance data collection system may execute a performance test of a control version of a program by executing an evaluation operation using the control version of the program. The performance data collection system may include a sampling profiler that records function call stacks at a regular sampling rate, which may indicate inclusive and/or exclusive times for the functions executed during the evaluation operation. The performance data collection system may store the collected performance values within database 140 (e.g., control performance values 208 within performance data 142) for use by the systems and methods described herein. The performance data collection system may also perform a similar evaluation operation using the modified version of the program, and store the collected performance values within database 140 (e.g., modified performance values 210 within performance data 142).

Receiving module 104 may receive control performance values 208 and modified performance values 210 in a variety of ways and/or contexts. For example, receiving module 104 may direct server 206 to access performance data 142 from database 140 and send control performance values 208 and modified performance values 210 to receiving module 104. Receiving module 104 may, as part of server 206, then receive control performance values 208 and modified performance value 210 from database 140. As another example, receiving module 104 may, as part of computing device 202 and/or server 206, direct computing device 202 to present user interface 220 to user 236. User 236 may enter control performance values 208 and modified performance values 210 into computing device 202 via user interface 220. Receiving module 104 may, as part of server 206, then receive control performance values 208 and modified performance values 210 from computing device 202 via network 204.

As will be described in greater detail below, receiving module 104 may additionally receive directions to perform tasks regarding a displayed call graph. For example, receiving module 104 may receive a direction to identify at least one node included in the set of nodes (e.g., nodes 216) that corresponds to a function that has a predefined attribute. As another example, receiving module 104 may receive a direction to update a call graph in accordance with a call graph operation. Additionally or alternatively, receiving module 104 may receive a user direction to view information associated with a modification applied to a function between an execution of an evaluation operation by a control version of a program and an execution of the evaluation operation by a modified version of the program.

Receiving module 104 may receive these various directions in any suitable way. For example, receiving module 104 may direct computing device 202 to present user interface 220 to user 236. User 236 may enter a direction (e.g., a direction to update a call graph in accordance with a call graph operation) via user interface 220. Receiving module 104 may then receive the direction from user interface 220. Additionally or alternatively, user interface 220 may record the direction at a suitable storage location (e.g., within at least one of memory 120 and/or database 140). Receiving module 104 may then receive the direction by accessing the suitable storage location.

Returning to FIG. 3, at step 320, one or more of the systems described herein may determine a set of comparative performance values based on the set of control performance values and the set of modified performance values, each comparative performance value in the set of comparative performance values representative of a variation in performance of a function during the execution of the evaluation operation by the control version of the program and the execution of the evaluation operation by the modified version of the program. For example, determining module 106 may determine comparative performance values 212 based on control performance values 208 and modified performance values 210, each comparative performance value in the set of comparative performance values representative of a variation in performance of a function during the execution of the evaluation operation by the control version of the program and the execution of the evaluation operation by the modified version of the program.

In some examples, a "comparative performance value" may be a performance value representative of a variation in performance of a function during an execution of an evaluation operation by a control version of the program and an execution of the evaluation operation by a modified version of the program.

Determining module 106 may determine comparative performance values 212 based on control performance values 208 and modified performance values 210 in a variety of contexts. For example, control performance values 208 may include an exclusive function time of 100 ms for a function named functionA( ), an exclusive function time of 150 ms for a function named functionB( ), and an exclusive function time of 50 ms for a function named functionC( ). Likewise, modified performance values 210 may include an exclusive function time of 105 ms for functionA( ), an exclusive function time of 90 ms for functionB( ), and an exclusive function time of 60 ms for functionC( ).

Determining module 106 may determine a comparative performance value for functionA( ) by calculating a difference between the performance value included in modified performance values 210 corresponding to functionA( ) and the performance value included in control performance values 208 corresponding to functionA( ). In this example, the difference may be 105 ms–100 ms=+5 ms. Determining module 106 may then include +5 ms in comparative performance values 212 as a comparative performance value corresponding to functionA( ). Continuing with this process, determining module 106 may determine and include in comparative performance values 212 a comparative performance value of –60 ms for functionB( ), and a comparative performance value of +10 ms for functionC( ).

Determining module 106 may utilize any suitable relationship between control performance values 208 and corresponding modified performance values 210 to determine comparative performance values 212 including, without limitation, a difference, a ratio, a total, an average, a linear relationship, a nonlinear relationship, and so forth. For example, determining module 106 may determine a ratio of a modified performance value included in modified performance values 208 corresponding to functionA( ) and a control performance value included in control performance values 210 corresponding to functionA( ), and include the determined ratio in comparative performance values 212 as a comparative performance value corresponding to functionA( ). Continuing with the previous example, determining module 106 may therefore include a comparative performance value of 105 ms/100 ms=1.05 for functionA( ), a comparative performance value of 90 ms/150 ms=0.6 for functionB( ), and a comparative performance value of 60 ms/50 ms=1.2 for functionC( ).

By determining comparative performance values corresponding to functions executed by the control version of the program and the modified version of the program, the systems and methods described herein may identify and/or isolate one or more useful metrics for comparing performance between the versions of the functions included in the control version of the program and the versions of the functions included in the modified version of the program.

Returning to FIG. 3, at step 330, one or more of the systems described herein may generate a call graph based on the set of comparative performance values, the call graph including (1) a set of nodes, each node in the set of nodes corresponding to a function, the function corresponding to a particular comparative performance value included in the set of comparative performance values, and (2) a set of edges, each edge in the set of edges directed from a node in the set of nodes corresponding to a caller function to a node in the set of nodes corresponding to a callee function called by the caller function. For example, generating module 108 may generate call graph 214 based on comparative performance values 212. Call graph 214 may include nodes 216, where each node in nodes 216 may correspond to a function, the function corresponding to a particular comparative performance value included in comparative performance values 212. Call graph 214 may also include edges 218, where each edge in edges 218 may be directed from a node in nodes 216 corresponding to a caller function to a node in nodes 216 corresponding to a callee function called by a caller function.

In some examples, a "call graph" may include a directed graph G=(V, E), where V is a set of vertices or nodes where each vertex or node is representative of a function (e.g., nodes 216) and E is a set of edges that represent direct function calls (e.g., edges 218) that may connect one or more of the nodes in V. For example, a call graph may include nodes u and v, which may represent two functions executed during an evaluation operation (e.g., functionA( ) and functionB( )) and an edge $e_{u,v}$ that represents a function call from the function represented by node u to the function represented by node v. By way of illustration, edge $e_{u,v}$ may represent a call of functionB( ) by functionA( ). In this illustration, functionA( ) may be a "caller" function and functionB( ) may be a "callee" function of functionA( ). A call graph may show each function with a single node; where a function is called from multiple caller functions, each caller function may be linked to the callee function by a directed edge from the caller function to the callee function.

Call graphs may be superior to other execution visualization methodologies for identifying performance regressions. For example, a common approach to visualizing call stacks may be to construct call trees, which may illustrate hierarchical call structures between functions. Like a call graph, a "call tree" may be a directed graph with nodes and edges (e.g., edges 406) that illustrate a hierarchical call structure between functions called and/or executed during the evaluation operation. However, unlike a call graph, a call tree may show each function call as a separate node, regardless of whether a function is also called elsewhere in the call stack.

Call trees may do a poor job of visualizing regressions. For example, suppose a regression occurred in a low-level function X (e.g., malloc( )) called from several functions. In this example, a call tree may show multiple instances of X, thus making it hard to summarize the total regression of X. In contrast, a call graph may show function X with a single node, which summarizes the regression for X globally within the entire call graph. This may make call graphs superior to call trees for identifying regressions, especially those in low-level functions with many callers.

To illustrate, FIG. 4A shows a call tree representative of an execution of an evaluation operation by a control version of a program. The call tree shown in FIG. 4A may visually show information that may be included in and/or derived from a set of control performance values (e.g., control performance values 208). As shown in FIG. 4A, node 402 represents a root function main( ) that may take 10 ms to execute. The main( ) function calls function malloc( ), represented by node 404, which may take 1 ms to execute. Nodes 402 and 404 are connected by edge 406-1, which indicates that the call of function malloc( ) by function main( ) may have an exclusive time of 1 ms.

As further shown in FIG. 4A, function main( ), represented by node 402, also calls functionA( ), represented by node 408, that takes 6 ms to execute. Edge 406-2 connects node 402 to node 408, and indicates that functionA( ) may have an inclusive time of 9 ms. Callee functionA( ) further calls functionB( ), represented by node 410, which may take 2 ms to execute. Edge 406-3 connects node 408 to node 410 and indicates that functionB( ) may have an inclusive time of 3 ms. Callee functionB( ) further calls function malloc( ), represented by node 412. Node 412 indicates that callee function malloc( ) takes 1 ms to execute. Edge 406-4 indicates that functionB( ) calls function malloc( ), and that function malloc( ) may have an inclusive time of 1 ms.

FIG. 4B shows a call tree representative of an execution of an evaluation operation by a modified version of the program associated with FIG. 4A. The call tree shown in FIG. 4B may visually show information that may be included in and/or derived from a set of modified performance values (e.g., modified performance values 210). As shown in FIG. 4B, node 414 represents a root function main( ) that may take 10 ms to execute. The main( ) function calls function malloc( ), represented by node 416, which takes 2 ms to execute. Nodes 402 and 404 are connected by edge 406-5, which indicates that the call of function malloc( ) by function main( ) may have an exclusive time of 1 ms.

As further shown in FIG. 4B, function main( ), represented by node 402, also calls functionA( ), represented by node 408, that takes 6 ms to execute. Edge 406-2 connects node 402 to node 408, and indicates that functionA( ) may have an inclusive time of 9 ms. The functionA( ) further calls functionB( ), represented by node 410, which may take 2 ms to execute. Edge 406-3 connects node 408 to node 410 and indicates that functionB( ) may have an inclusive time of 3 ms. The functionB( ) further calls function malloc( ), represented by node 412. Node 412 indicates that function malloc( ) takes 1 ms to execute. Edge 406-4 indicates that functionB( ) calls function malloc( ), and that function malloc( ) may have an inclusive time of 1 ms.

Figure 4C:
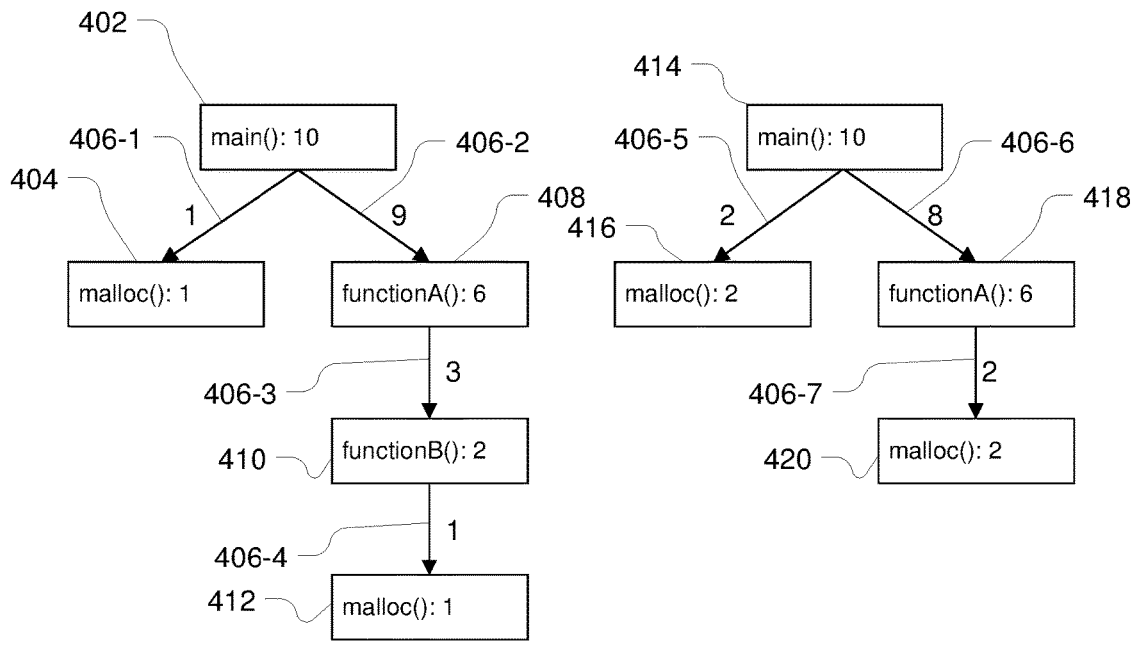
Figure 4C:
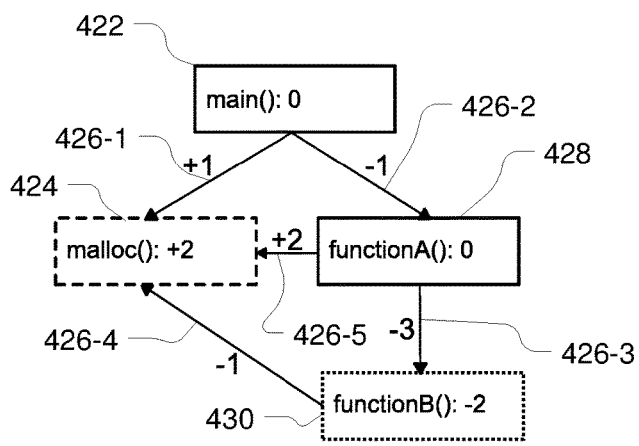

In contrast, FIG. 4C illustrates a comparative call graph that generating module 108 may generate based on a set of comparative performance values determined from the set of control performance values shown in FIG. 4A and the set of modified performance values shown in FIG. 4B. As shown, function main( ), represented by node 422, may have a comparative performance value of 0 ms, which may indicate that the control performance value corresponding to function main( ) and the modified performance value corresponding to function main( ) may have the same value (e.g., 10 ms, as shown by nodes 402 and 414). The main( ) function calls function malloc( ), represented by node 424. Nodes 422 and 424 are connected by edge 426-1, which may indicate that the calls of function malloc( ) by function main( ) may have a comparative exclusive time of +1 ms.

Node 424 indicates that the function malloc( ) may have a comparative performance value of +2 ms, indicating that calls to malloc( ) may take 2 ms longer in the modified version of the program than in the control version of the program. Node 424 also has a dashed outline. As will be described in greater detail below, this dashed outline may, in accordance with a weighting of the comparative performance value corresponding to node 424 (e.g., +2 ms), visually indicate that calls to the malloc( ) function may take more time to execute in the modified version of the program than the control version of the program. A dashed outline may therefore enable a viewer to visually identify nodes in a comparative call graph that represent functions in the modified version of the program that may introduce performance regressions into the program.

Edge 426-2 indicates that function main( ) also calls functionA( ), represented by node 428, in at least one of the test runs. Node 428 indicates that functionA( ) may have a comparative performance value of 0 ms, which may indicate that the control performance value corresponding to functionA( ) and the modified performance value corresponding to functionA( ) may have the same value (e.g., 6 ms, as shown by nodes 408 and 418).

Edge 426-3 indicates that functionA( ) calls functionB( ), represented by node 430, in at least one of the test runs (e.g., the execution of the evaluation operation by the control version of the program) with a comparative exclusive time of −3 ms. Node 430 indicates that functionB( ) may have a comparative performance value of −2 ms, which may indicate that the control performance value corresponding to functionB( ) and the modified performance value corresponding to functionB( ) may have a difference of −2 ms. Node 430 has a dotted outline. As will be described in greater detail below, this dotted outline may, in accordance with a weighting of the comparative performance value corresponding to node 428 (e.g., −2 ms), visually indicate that calls to functionB( ) may take less time to execute in the modified version of the program than the control version of the program. A dotted outline may therefore enable a viewer to visually identify nodes in a comparative call graph that represent functions in the modified version of the program that may introduce performance improvements into the program.

Edge 426-4 indicates that functionB( ) calls function malloc( ) in at least one of the test runs (e.g., the execution of the evaluation operation by the control version of the program) with a comparative exclusive time of −1 ms. Likewise, edge 426-5 indicates that functionA( ) calls function malloc( ) in at least one of the test runs (e.g., the execution of the evaluation operation by the modified version of the program) with a comparative exclusive time of +2 ms.

Returning to FIG. 3, at step 340, one or more of the systems described herein may weight each node in the set of nodes in accordance with the comparative performance value corresponding to the node. For example, weighting module 110 may weight each node in nodes 216 in accordance with the comparative performance value in comparative performance values 212 corresponding to the node.

Weighting module 110 may weight each node in nodes 216 in a variety of contexts. For example, as described above, weighting module 110 may establish a scheme of line styles that may visually distinguish nodes representative of functions that take different amounts of time to execute in the modified version of the program than in the control version of the program. As shown in FIG. 4C, a suitable line style scheme may designate nodes corresponding to functions that take more time to execute in the modified version of the program than in the control version of the program to be displayed with a dashed outline, as node 424. A suitable line style scheme may also designate nodes corresponding to functions that take less time to execute in the modified version of the program than in the control version of the program to be displayed with a dotted outline, as node 430.

In some examples, a suitable line style scheme may vary a line style assigned to a node based on a relationship between the comparative performance value corresponding to the node and a midpoint comparative value. For example, nodes corresponding to comparative performance values closer to a midpoint comparative value of 0 may be represented with dotted lines and/or dashed lines with lesser spacing between the dots and/or dashes, such that a variance of a comparative performance value corresponding to a node relative to the midpoint comparative value of 0 may be readily apparent to a user based on the intra-dot and/or intra-dash spacing of the assigned line style of the node. Other attributes of a line style that a suitable line style scheme may vary may include, without limitation, a line thickness, a number of lines, styles of a plurality of lines, and so forth.

In other examples, weighting module 110 may weight each node in nodes 216 in accordance with the comparative performance values corresponding to the nodes by establishing a diverging color scheme based on a midpoint comparative performance value. For example, weighting module 110 may establish color scheme 222 based on midpoint 224. Weighting module 110 may also, for each node in the set of nodes, assign a display color included in the diverging color scheme to the node such that the display color assigned to the node reflects a relationship between the comparative performance value corresponding to the node and the midpoint comparative performance value. For example, weighting module 110 may assign a display color (e.g., at least one of colors 226) to each node in nodes 216 such that the display color assigned to the node reflects a relationship between the comparative performance value corresponding to the node and midpoint 224.

In some examples, a "diverging color scheme" may be a color scheme based on at least two different hues that diverge from a shared light color at a predetermined midpoint toward darker shades of the two different hues at each extreme. Such a color scheme may be mapped to a set of values (e.g., comparative performance values 212) to visually represent how much each value in the set of values diverge from a predetermined midpoint value.

For example, weighting module 110 may establish a diverging color scheme around a midpoint comparative value of 0 ms, with a shared light color of white and hues of blue and red. Weighting module 110 may then assign nodes corresponding to comparative performance values having a value less than 0 ms a shade of blue, with smaller values (i.e., values farther from the midpoint of 0 ms) having darker shades of blue, and larger values (i.e., values closer to the midpoint of 0 ms) having lighter shades of blue. Weighing module 110 may further assign nodes corresponding to comparative performance values having a value greater than 0 a shade of red, with larger values (i.e., values farther from the midpoint of 0 ms) having darker shades of red, and smaller values (i.e., values closer to the midpoint of 0 ms) having lighter shades of red.

In some examples, the midpoint comparative performance value may represent a comparative performance value having less than a predetermined maximum threshold value (e.g., +1 ms) and greater than a maximum threshold value (e.g., −1 ms). Thus, in some examples, weighting module 110 may establish a "zero range" surrounding the midpoint comparative performance value, wherein all comparative performance values within that range are treated as equivalent to the midpoint comparative performance value. In such examples, weighting module 110 may assign nodes corresponding to functions having comparative performance values that are both less than the predetermined maximum threshold value and greater than the predetermined minimum threshold value the same midpoint color value. This may enable the systems and methods described herein to highlight nodes having comparative performance values outside of the zero range by assigning colors different from the midpoint color value only to nodes corresponding to functions with comparative performance values outside of the range surrounding the midpoint comparative performance value.

In some embodiments, weighting module 110 may weight each edge in edges 218 in a fashion similar to the weighting of nodes 216. For example, weighting module 110 may, for each edge in edges 218, determine a proportional performance value associated with a proportion of the comparative performance value associated with the node of the caller function attributable to the callee function.

By way of example, a caller function callerFunction( ) with a comparative performance value of +100 ms may call two functions: calleeFunctionA( ) with a comparative performance value of +120 ms and calleeFunctionB( ) with a comparative performance value of −20 ms. Weighting module may determine a proportional performance value for an edge directed from a node representative of callerFunction( ) to a node representative of calleeFunctionA( ) of +12, and a proportional performance value of −2 for an edge directed from the node representative of callerFunction( ) to a node representative of calleeFunctionB( ).

Additionally, weighting module 110 may weight each edge in edges 218 in accordance with the proportional performance value of the edge. Weighting module 110 may weight each edge in edges 218 in any of the ways described herein in reference to weighting of nodes 216. For example, weighting module 110 may establish a suitable weighting scheme of line styles, a diverging color scheme, and/or any other weighting scheme that may visually distinguish edges having varying proportional performance values from each other, and may weight edges 218 in accordance with the established weighting scheme.

By weighting nodes 216 in accordance the comparative performance values corresponding to the nodes and/or by weighting edges 218 in accordance with proportional performance values corresponding to the edges, weighting module 110 may, upon a display of call graph 214 to a user (e.g., user 236), enable the user to visually identify nodes representative of functions that perform differently in the control version of the program and the modified version of the program. This may further enable the user to identify functions that may introduce possible performance regressions into the program.

Returning to FIG. 3, at step 350, one or more of the systems described herein may display the call graph via a user interface in accordance with the weighting of each node in the set of nodes. For example, displaying module 112 may display call graph 214 via user interface 220 in accordance with the weighting of nodes 216. Additionally or alternatively, one or more of the systems described herein may display the call graph via the user interface in accordance with a weighting of each edge in the set of edges. For example, displaying module 112 may display call graph 214 via user interface 220 in accordance with the weighting of edges 218.

Displaying module 112 may display call graph 214 via user interface 220 in accordance with the weighting of nodes 216 and/or the weighting of edges 218 in a variety of contexts. For example, displaying module 112 may display call graph 214 as a graphical object within user interface 220.

In some examples, displaying module 112 may display additional information associated with functions associated with nodes included in call graph 214. For example, as described above, receiving module 104 may receive a direction (e.g., from user 236 via user interface 220) to identify at least one node included in the set of nodes that corresponds to a function that has a predefined attribute. Displaying module 112 may identify at least one node included in the set of nodes that corresponds to a function that has the predefined attribute, and annotate the identified node to indicate that the identified node has the predefined attribute.

Figure 5:
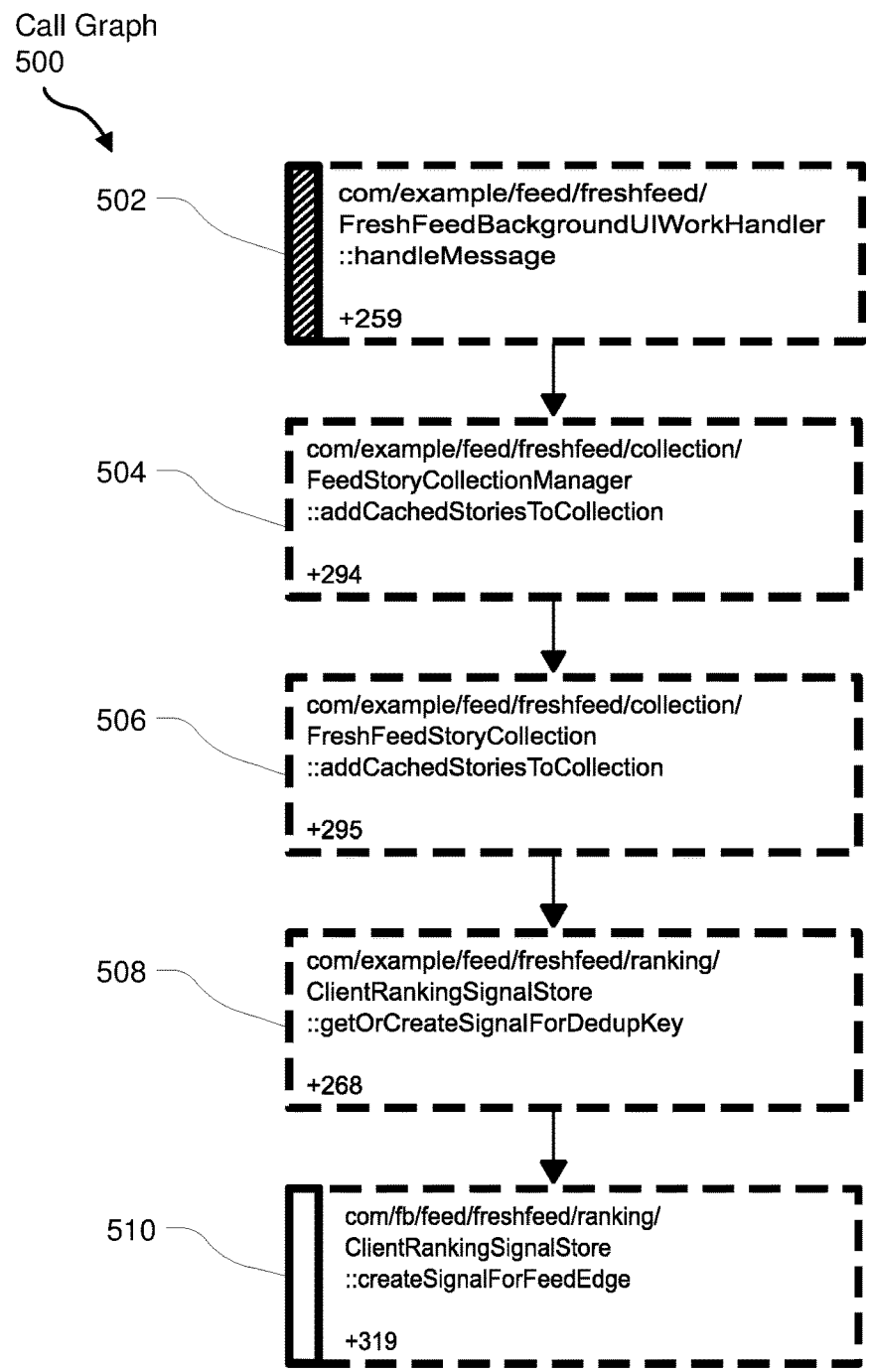
FIGS. 5-6 illustrate identifying and annotating nodes that have predefined attributes.

By way of illustration, FIG. 5 shows an example call graph 500 that displaying module 112 may display via user interface 220. As shown, call graph 500 includes nodes 502 through 510. As descried above, each of nodes 502 through 510 may correspond to a different function included in a program. For example, as shown in FIG. 5, node 502 indicates that it may correspond to a function (also termed a method in some object-oriented programming contexts) handleMessage with a comparative performance value of +259 ms. In some examples, as further illustrated in FIG. 5, nodes may display additional information regarding functions with which they correspond. For example, node 502 indicates that function handleMessage may be included in a class named FreshFeedBackgroundUIWorkHandler in a package named com/example/feed/freshfeed/.

As further shown in FIG. 5, node 504 may correspond to a function addCachedStoriesToCollection with a comparative performance value of +294 ms included in a class named FeedStoryCollectionManager in a package named com/example/fee/freshfeed/collection. Node 506 may correspond to a function named addCachedStoriesToCollection with a comparative performance value of +295 ms included in a class named FeedStoryCollectionManager in a package named com/example/feed/freshfeed/collection. Node 508 may correspond to a function getOrCreateSignalForDedupKey with a comparative performance value of +268 included in a class named ClientRankingSignalStore in a package named com/example/feed/freshfeed/ranking/. Node 510 may correspond to a function createSignalForFeedEdge with a comparative performance value included in a class named ClientRankingSignalStore in a package named com/example/feed/freshfeed/ranking/. All of nodes 502 through 510 have positive comparative performance values, and are therefore displayed with a dashed outline in accordance with the example line style scheme described above in reference to FIG. 4C.

Additionally, node 502 has a diagonally hatched band or tag along its left-hand side, and node 510 has a white band or tag along its left-hand side. As will be described in greater detail below, these tags may indicate that node 502 corresponds to a function that has a predefined attribute, and that node 510 corresponds to a function that has another predefined attribute. For example, function handleMessage represented by node 502 may be a root function (i.e., a function that calls other functions), while function createSignalForFeedEdge may have been modified and/or changed from the control version of the program by a modification included in the modified version of the program.

Other predefined attributes of a function may include, without limitation, an indication that one or more source code files that include source code corresponding to the function was changed and/or modified between the control version of the program and the modified version of the program, an indication that the function was executed during only one of the test runs (e.g., by only one of the control version of the program or the modified version of the program), the function has a comparative performance value that meets or exceeds a predetermined threshold value, and so forth.

In some examples, displaying module 112 may annotate a node that corresponds to a function that has a predefined attribute in a variety of ways. As shown in FIG. 5, displaying module 112 may add a hatched, striped, colored, and/or otherwise distinctive band or tag to a portion of the node. In other examples, displaying module 112 may annotate a node that corresponds to a function that has a predefined attribute by adjusting a relative size of the node, adjusting a shape of at least a portion of the node, and so forth. Examples of some of such annotations will be provided in greater detail below.

Thus, with regard to FIG. 5, receiving module 104 may have received a direction (e.g., from user 236) to identify at least one node included in nodes 502 through 510 that corresponds to a root function. Displaying module 112 may have identified node 502 as having that predefined attribute, and may have annotated node 502 with the diagonally hatched band to indicate that node 502 corresponds to a root function. Likewise, receiving module 104 may also have received a direction (e.g., from user 236) to identify at least one node included in nodes 502 through 510 that corresponds to a function that may have been modified and/or changed from the control version of the program to the modified version of the program. Displaying module 112 may have identified node 510 has having that predefined attribute, and may have annotated node 510 with the white band to indicate that node 510 corresponds to a function that may have been modified and/or changed from the control version of the program to the modified version of the program.

In some examples, where the predefined attribute includes an indication that the modified version of the program includes a modification to the function that is omitted from the control version of the program, receiving module 104 may receive a direction (e.g., from user 236) to view information associated with the modification, and display module 112 may display information regarding the modification via the user interface (e.g., user interface 220).

Figure 6:
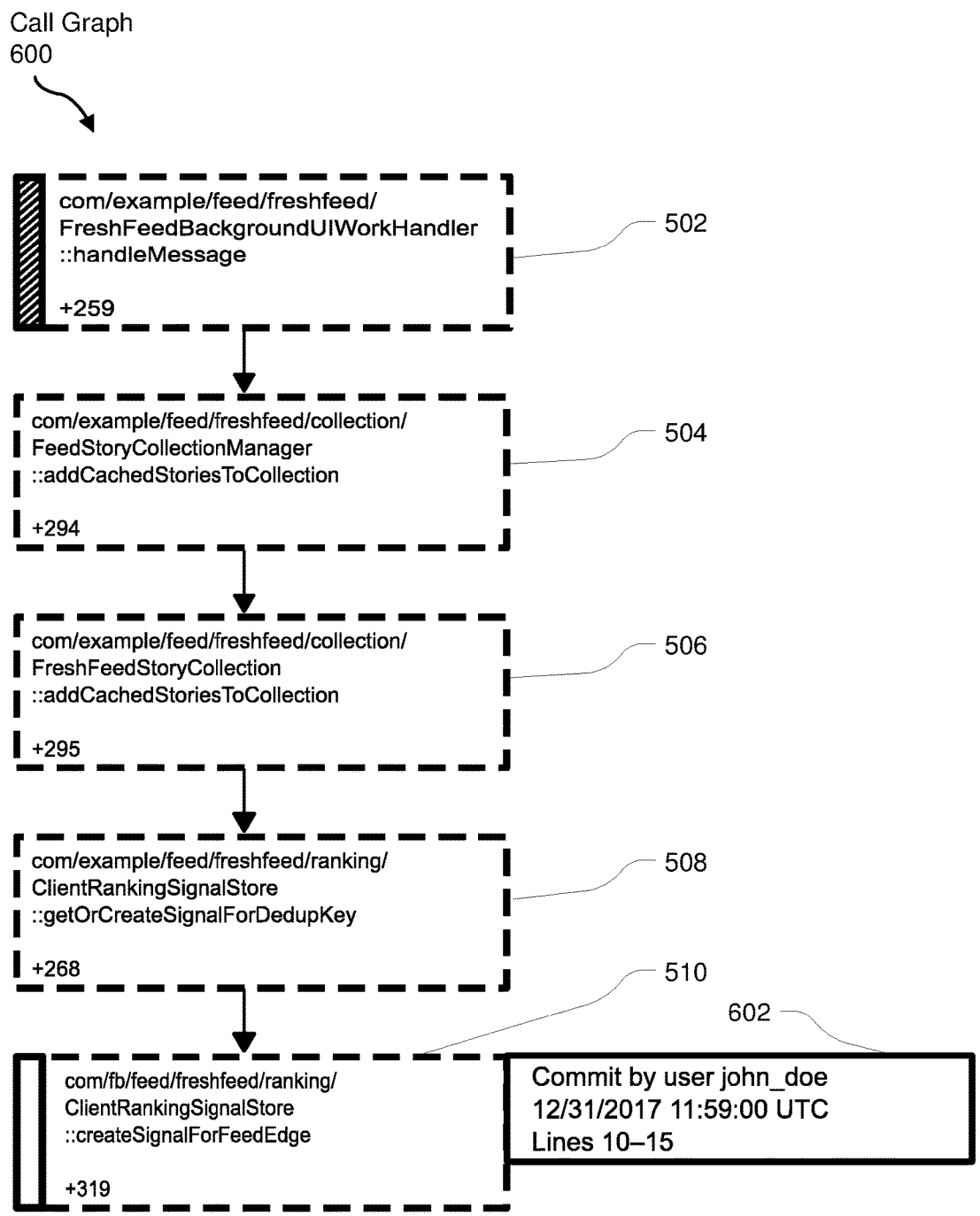

By way of illustration, FIG. 6 shows an example call graph 600 that includes nodes 502 through 510, and has also been annotated to indicate that node 502 corresponds to a root function and that node 510 corresponds to a function that includes a modification that is not included in the control version of the program. Receiving module 104 may receive a direction from user 236 to display information associated with the modification. Displaying module 112 may then access a suitable data source, such as a source code management system, and display information associated with the modification. As shown in FIG. 6, indication 602 shows that the modification may have been a commit by user johndoe on Dec. 31, 2017 at 11:59:00 UTC. Indication 602 further shows that the modification may be included in lines 10-15 of a source code file that includes source code for function createSignalForFeedEdge. This may enable a user (e.g., a developer) to identify a particular modification of a specific function (e.g., a modification to lines 10-15 of function createSignalForFeedEdge by user johndoe at 11:59:00 UTC on Dec. 31, 2017) as the root cause of one or more performance regressions.

In some embodiments, one or more of the systems described herein may receive a direction to update a call graph in accordance with a call graph operation, and may update the call graph in accordance with the call graph operation. For example, receiving module 104 may receive update direction 228, and updating module 114 may update call graph 214 in accordance with update direction 228.

In some examples, a "call graph operation" may be any operation performed relative to call graph 214 (e.g., relative to at least one of nodes 216 and/or at least one of edges 218) that may modify a display of call graph 214. Examples of call graph operations may include, without limitation, a hide operation, a remove operation, a focus operation, and a merge operation. Each of these call graph operations will be described in detail below.

In some embodiments, a "hide operation" may be a call graph operation that results in a set of nodes being removed from a display of a call graph without other side effects. Additional edges may not be added, and an inclusive time of other nodes may not be updated in response to the set of nodes being removed from the call graph. Thus, in some embodiments, update direction 228 may include information representative of a direction to update call graph 214 in accordance with a hide operation. Update direction 228 may further include a selection of at least one node included in call graph 214. Receiving module 104 may receive update direction 228, and updating module 114 may update call graph 214 by removing the selected node from a display of call graph 214.

Figure 7:
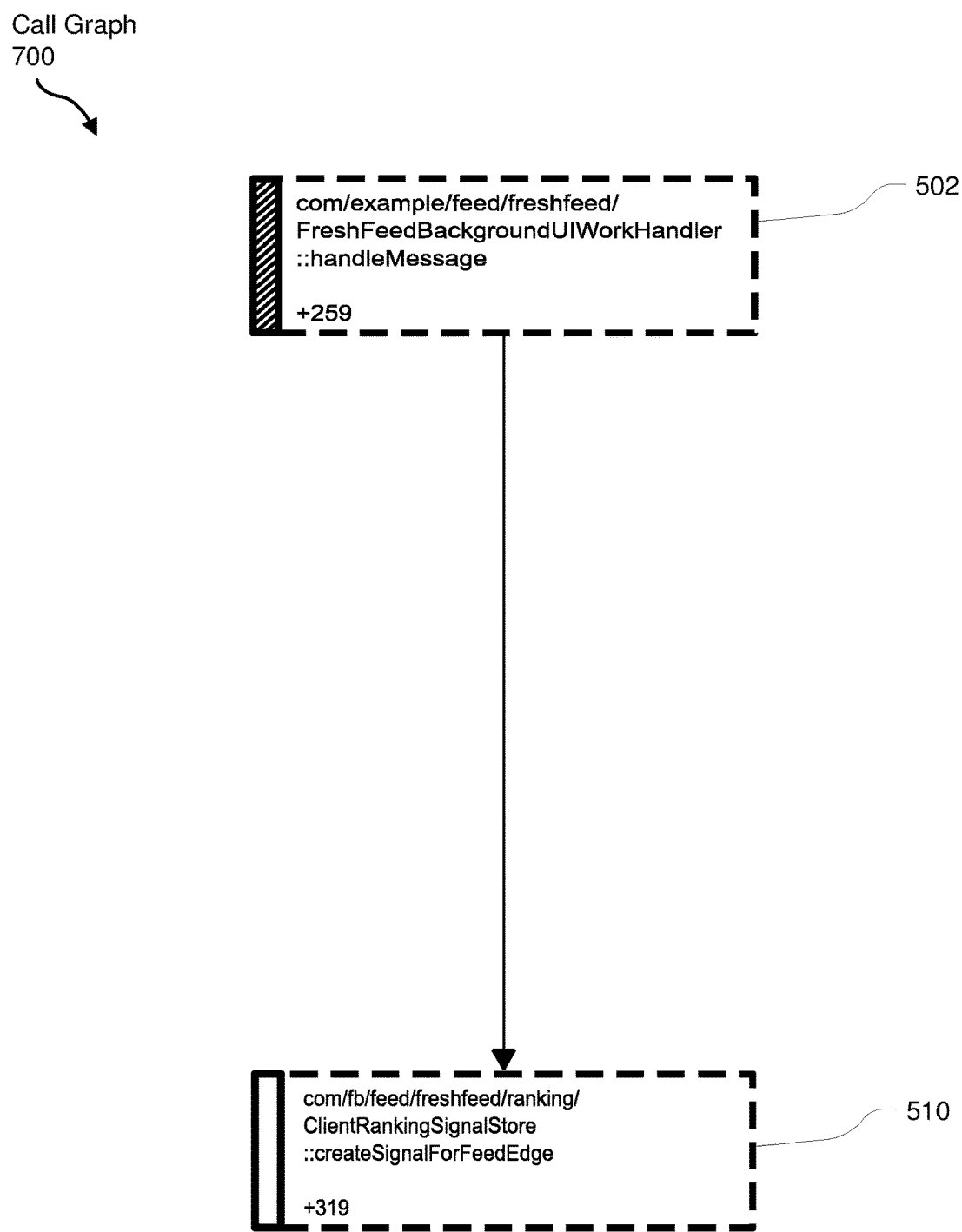
FIG. 7 illustrates a hide call graph operation.

By way of illustration, FIG. 7 shows an example call graph 700 that includes nodes 502 and 510. In this illustration, call graph 700 shows a resulting call graph after receiving module 104 has received update direction 228, where update direction 228 included a direction to update call graph 500 in accordance with a hide operation and a selection of nodes 504 through 508. Updating module 114 has updated call graph 500 by "hiding" node 504 through node 508, resulting in call graph 700.

In some embodiments, a "remove operation" may be a call graph operation wherein updating module 114 updates the call graph by (1) removing a selected set of nodes from the call graph, and (2) updating the comparative performance values corresponding to the nodes in the set of nodes and the edges in the set of edges based on removing the selected set of nodes from the set of nodes included in the call graph. This may result in a subtraction of inclusive time effects of removed edges, as well as a rerouting of edges that accounts for the removed nodes. Thus, in some embodiments, update direction 228 may include information representative of a direction to update call graph 214 in accordance with a remove operation. Update direction 228 may further include a selection of at least one node included in call graph 214. Receiving module 104 may receive update direction 228, and updating module 114 may update call graph 214 by (1) removing the selected node from call graph 214, and (2) updating comparative performance values 212 corresponding to nodes 216 and edges 218 based on removing the selected node from the set of nodes.

Figure 8:
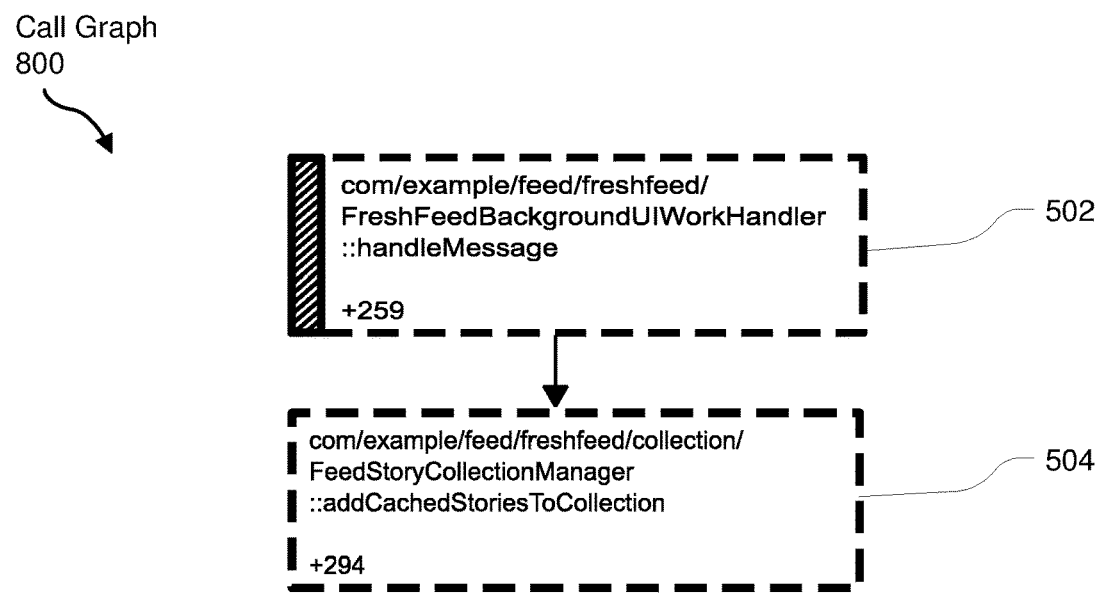
FIG. 8 illustrates a remove call graph operation.

FIG. 8 illustrates an example call graph 800 that includes nodes 502 and 504. In this illustration, call graph 800 shows a resulting call graph after receiving module 104 receives update direction 228, where update direction 228 includes a direction to update call graph 500 in accordance with a remove operation and a selection of node 506. Updating module 114 may update call graph 500 by (1) removing node 506 from nodes 216, and (2) updating comparative performance values 212 corresponding to nodes 216 and edges 218 by removing nodes 508 and 510 from call graph 214, along with the edges that connect nodes 504 and 506, nodes 506 and 508, and nodes 508 and 510. Updating module 114 may remove those nodes and edges because, with node 506 removed, nodes 508 and 510 may no longer be reachable by any path from node 504, and thus updating module 114 may update the comparative performance values corresponding to nodes 508 and 510 to values that indicate that displaying module 112 should not display the functions corresponding to nodes 508 and 510 as nodes in call graph 214 (e.g., null values, values outside of a predetermined range surrounding midpoint 224, removing comparative performance values corresponding to nodes 508 and 510 from comparative performance values 212, etc.).

In some examples, a "merge operation" may be a call graph operation wherein the call graph is updated by replacing a selected set of at least two nodes with a merged node. Updating module 114 may replace the selected set of nodes with the merged node by determining a merged comparative performance value based on the comparative performance values corresponding to the selected set of nodes and designating the determined merged comparative performance value as the comparative performance value corresponding to the merged node.

Updating module 114 may determine a merged comparative performance value based on the comparative performance values corresponding to the selected set of nodes in any suitable way. For example, updating module 114 determine the merged comparative performance value by determining a sum of the comparative performance values corresponding to the selected set of nodes, by selecting a comparative performance value corresponding to a node in the selected set of nodes with the highest or lowest value, by determining an average (e.g., median, mode, mean, etc.) of the comparative performance values corresponding to the selected set of nodes, and so forth.

Updating module 114 may further replace the at least two nodes with the merged node by removing the at least two nodes from the set of nodes, including the merged node in the set of nodes, and updating the comparative performance values corresponding to each node included in the set of nodes and the set of edges based on removing the at least two nodes from the set of nodes and including the merged node in the set of nodes.

Figure 9:
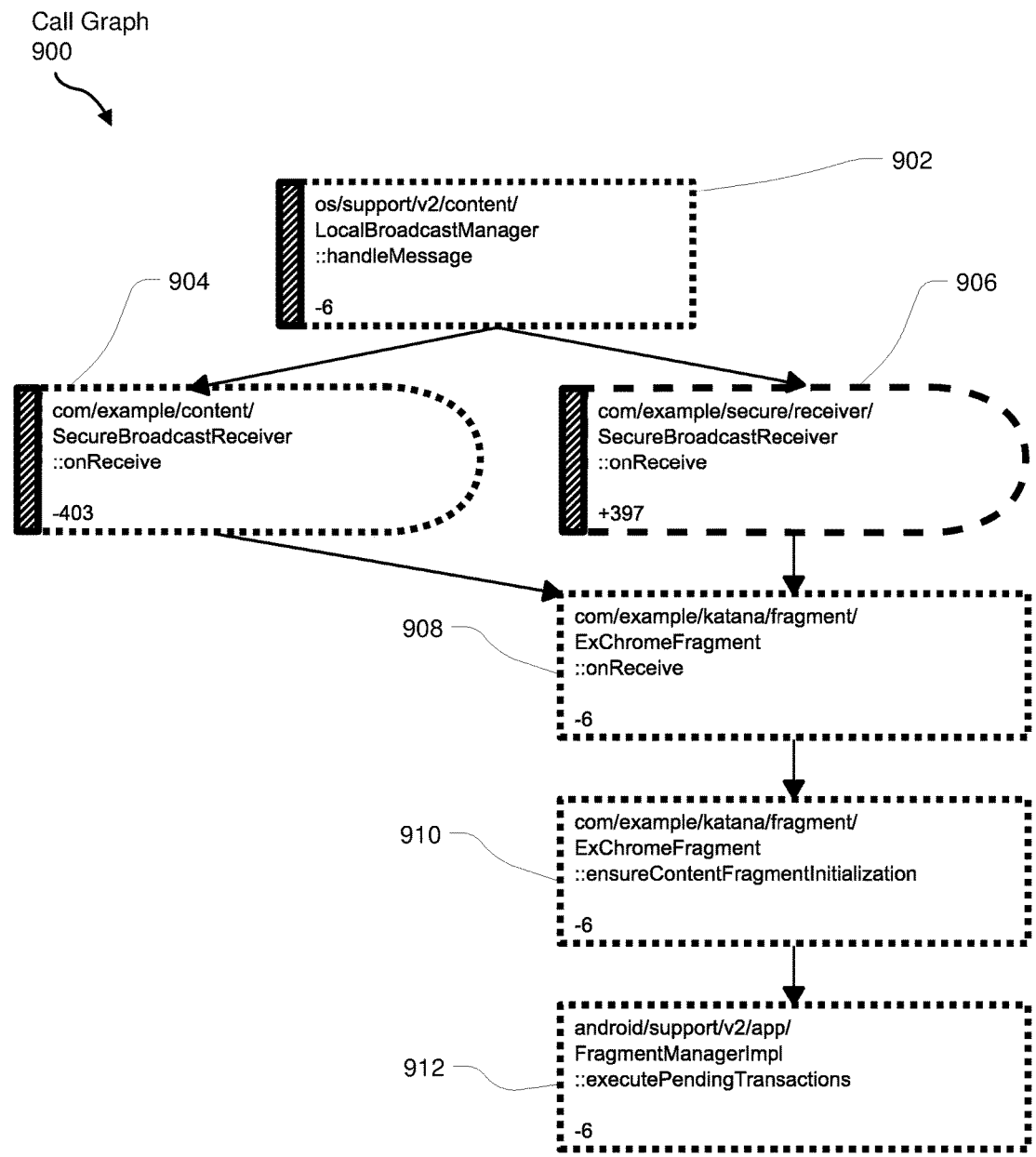
FIGS. 9-10 illustrate a merge call graph operation.

By way of illustration, FIG. 9 shows a call graph 900 that includes node 902 through node 912. Node 902 may correspond to a function named handleMessage with a comparative performance value of −6 ms included in a class LocalBroadcastManger in a package named os/support/v2/content/. Node 904 may correspond to function named onReceive with a comparative performance value of −403 ms included in a class SecureBroadcastReceiver in a package named com/example/content/. Node 906 may correspond to a function named onReceive with a comparative performance value of +397 ms included in a class SecureBroadcastReceiver in a package named com/example/secure/receiver/. Node 908 may correspond to a function named onReceive with a comparative performance value of −6 ms included in a class ExChromeFragment in a package named com/example/katana/fragment/. Node 910 may correspond to a function named ensureContentFragmentInitialization with a comparative performance value of −6 ms included in a class ExChromeFragment in a package named com/example/katana/fragment/. Node 912 may correspond to a function named executePendingTransactions with a comparative performance value of −6 ms included in a class FragmentManagerImpl in a package named android/support/v2/app/.

Call graph 900 further indicates that the function corresponding to node 902 calls the functions corresponding to node 904 and node 906, the functions corresponding to nodes 904 and node 906 each call the function corresponding to node 908, the function corresponding to node 908 calls the function corresponding to node 910, and the function corresponding to node 910 calls the function corresponding to node 912.

Node 902 through 912 may also be weighted in accordance with a line style scheme such described above in reference to FIGS. 4C and 5. Nodes 902, 904, and 906 also include indications (e.g., diagonally hatched bands along their left-hand side) that nodes 902, 904, and 906 may be root functions. Node 904 and node 906 also include annotations (e.g., outwardly curved right edges) that may indicate that the functions corresponding to node 904 and node 906 may only be executed by one of the control version of the program and the modified version of the program.

As may be apparent from the names of the functions that correspond to node 904 and node 906 and the annotations indicating that the functions corresponding to node 904 and node 906 may only be executed by one of the control version of the program and the modified version of the program, it may be that source code corresponding to the onReceive function may have been relocated from package com/example/secure/receiver/to package com/example/content/ prior to a build of the modified version of the program. Thus, the apparent variation in the comparative performance values may indicate this refactoring, and may not actually indicate a regression. It may therefore be helpful to merge node 904 and node 906. Receiving module 104 may receive an update direction (e.g., via user interface 220) that includes a direction to update call graph 900 in accordance with a merge operation. The update direction may further include a selection of node 904 and node 906. Updating module 114 may then update call graph 900 by replacing node 904 and node 906 with a merged node.

Updating module 114 may replace node 904 and node 906 with a merged node by determining a sum of the comparative performance values corresponding to node 904 and node 906, which sum may be −6 ms. Updating module 114 may then designate −6 ms as the comparative performance value corresponding to the merged node. Updating module 114 may then remove node 904 and node 906 from nodes 216, include the merged node in nodes 216, and update the comparative performance values corresponding to each node in nodes 216 and edges 218 based on removing node 904 and node 906 from nodes 216 and including the merged node in nodes 216.

Figure 10:
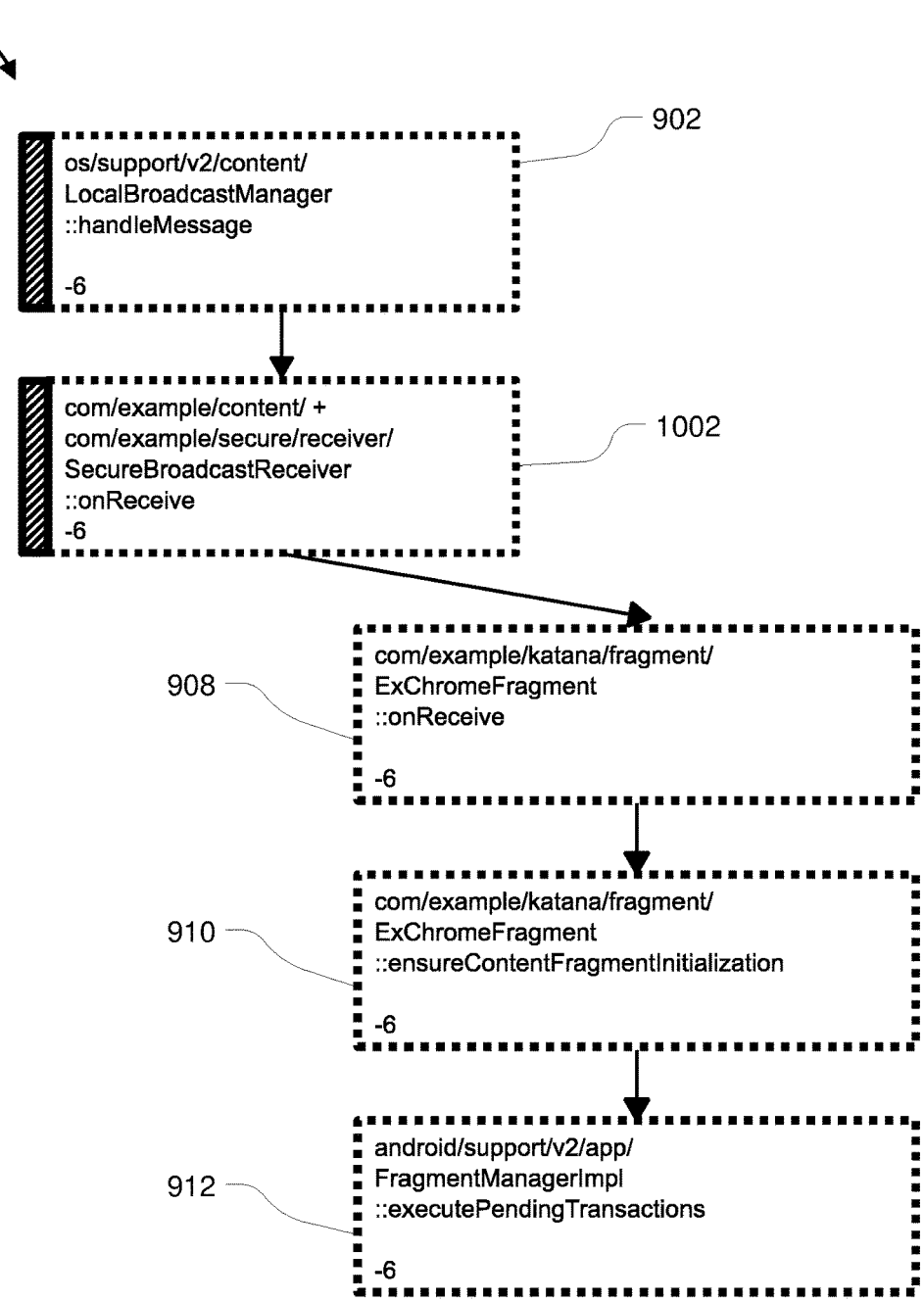

FIG. 10 illustrates a call graph 1000 that may represent call graph 900 after updating module 114 updates graph 900 in accordance with a merge operation involving node 904 and node 906. As shown in FIG. 10, node 904 and node 906 have been removed, and merged node 1002 has been added. Merged node 1002 indicates that it corresponds to a merger of functions onReceive included in class SecureBroadcastReceiver in both packages com/example/content/ and com/example/secure/receiver. Merged node 1002 may correspond to a comparative performance value of the sum of the comparative performance values of the functions corresponding to node 904 and node 906, or −6 ms. It may also be apparent, based on the weighting of the nodes included in call graph 1000, that all functions represented by nodes in call graph 1000 improved in performance between the control version of the program and the modified version of the program (e.g., all nodes have a dotted outline rather than a dashed outline).

In some examples, a "focus operation" may be a call graph operation where updating module 114 may hide all nodes that are not within k hops of a selected set of nodes. With a sufficiently large k, a focus operation may cause display module 112 to display all predecessors and successors of the selected set of nodes. Therefore, in examples where a call graph operation includes a focus operation, a direction to update the call graph may include (1) a selection of at last one node included in the displayed call graph, and (2) a length of a path from the selected node (e.g., a k value). Updating module 114 may update a call graph (e.g., call graph 214) by determining (1) a reachable subset of nodes that includes a subset of the nodes that are reachable from the selected node within the length of the path (e.g., within k hops), and (2) an unreachable subset of nodes that includes a subset of the nodes that are not reachable from the selected node within the length of the path (e.g., within k hops). Updating module 114 may then remove the nodes included in the unreachable set of nodes from the displayed call graph.

Figure 11:
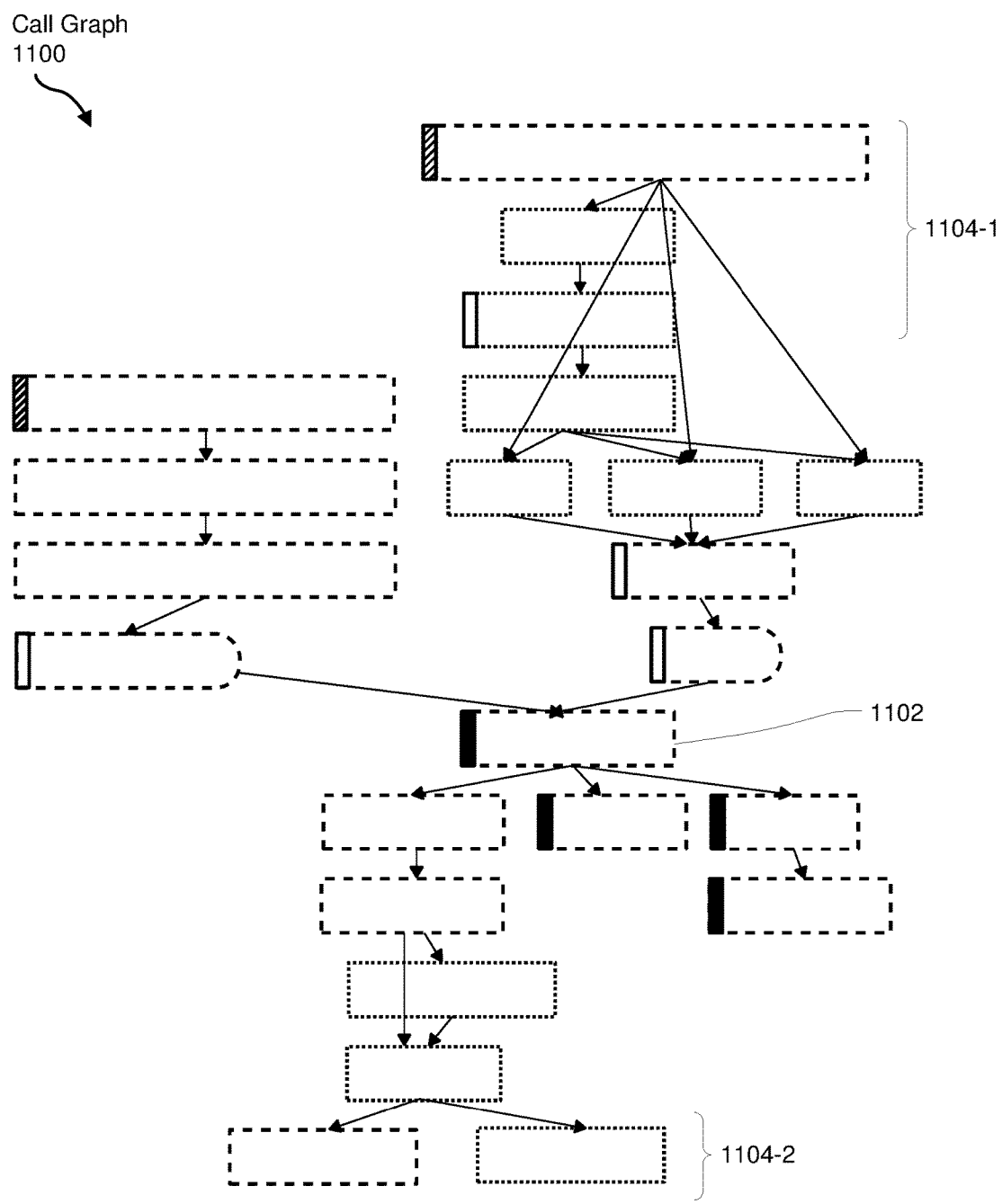
FIGS. 11-12 illustrate a focus call graph operation.

FIG. 11 illustrates another example call graph 1100. Call graph 1100 may include more nodes and/or edges than other call graphs illustrated herein. This larger number of nodes and/or edges may be unwieldy for a user (e.g., end user 236) to view and/or analyze. Thus, the user may desire to "focus" call graph 1100 on a set of nodes within a selected number of hops of a selected node, such as node 1102.

Figure 12:
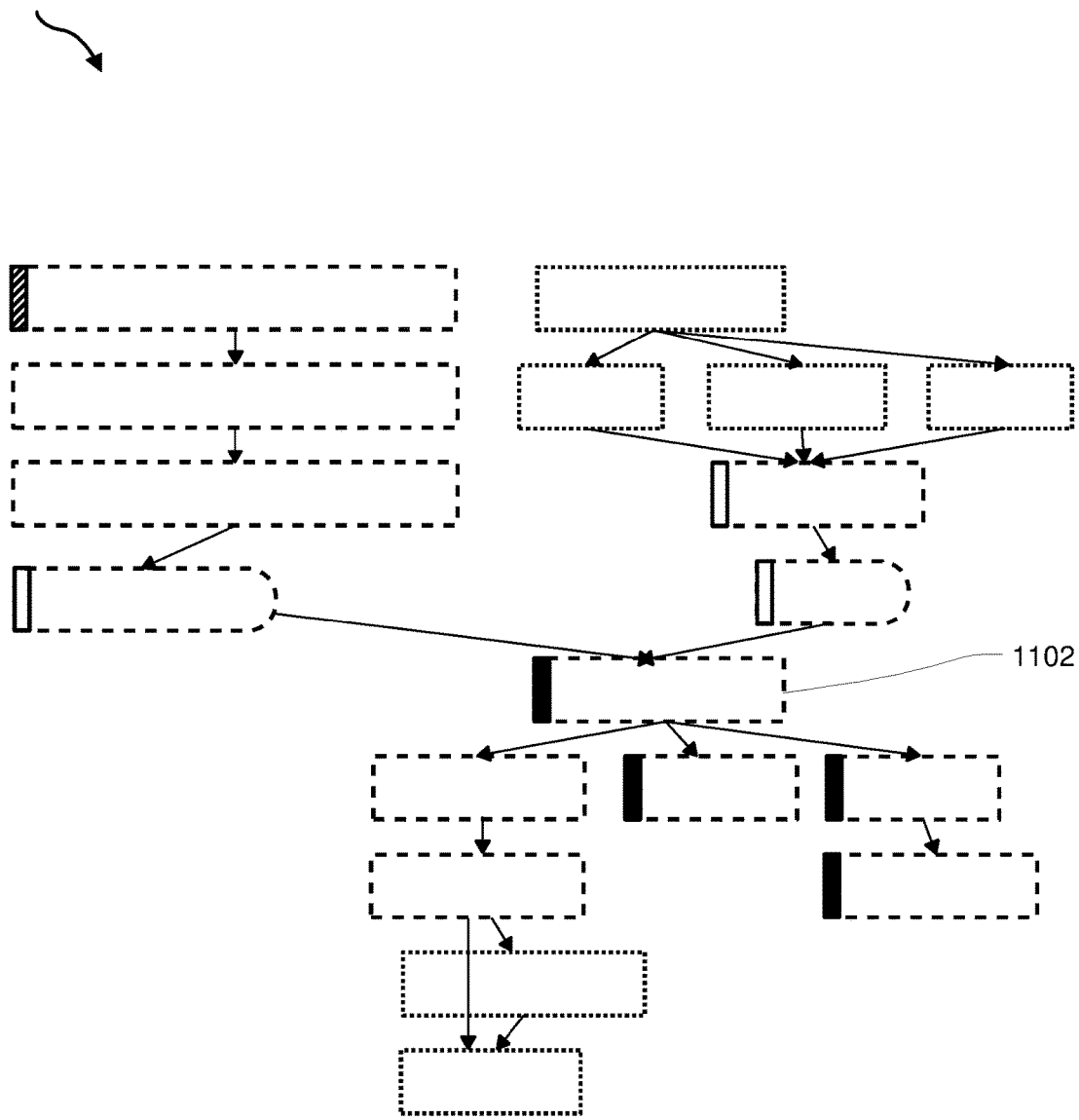

Thus, in some embodiments, receiving module 104 may receive a direction (e.g., update direction 228 from user 236 via user interface 220) to update call graph 1100 in accordance with a focus operation. The direction may include a selection of at least one node included in the displayed call graph. For example, the selection may include node 1102 included in displayed call graph 1100. The direction may also include a length of a path from a selected node, such as a length of 4 "hops" from node 1102. Updating module 114 may update call graph 1100 by determining a subset of nodes in displayed call graph 1100 that are reachable within 4 hops of node 1102, and a subset of nodes that are not reachable within 4 hops of node 1102, shown as node sets 1104 (e.g., node set 1104-1 and node set 1104-2) in FIG. 11. Updating module 114 may then remove the nodes included in the unreachable subset of nodes from the displayed call graph. FIG. 12 shows a focused call graph 1200 that may represent a version of displayed call graph 1100 after execution of the foregoing focus operation. As shown, unreachable node sets 1104 are not included in focused call graph 1200, whereas the nodes that are reachable within 4 hops of node 1102 are included in focused call graph 1200.

Each of the call graph operations described herein may aid users in evaluating a call graph to identify possible performance regressions. Such operations may simplify a displayed call graph, remove unnecessary or undesired nodes from a call graph, and/or may enable users to focus on one or more relevant portions of the call graph as they examine the call graph for possible regressions and/or root causes of regressions.

As discussed throughout the instant disclosure, the systems and methods disclosed herein may provide one or more advantages over traditional systems and methods for evaluating application performance changes. For example, visually weighting and displaying a call graph generated from a set of comparative performance values as described herein may support high-level exploration and interactive analysis of comparative performance of two different application versions. Visual weighting of individual nodes corresponding to individual functions based on comparative performance values of those functions may also enable developers to quickly identify problematic functions and/or groups of functions within even very large application code bases.

Embodiments of the systems and methods described herein may also annotate a call graph with additional information that may be useful to a developer as he or she attempts to triage performance regressions, such as annotations or tags indicating functions that may have associated source code changes between two application versions. Additional information from other data sources (e.g., source code management systems, task management systems, etc.) may be integrated into and/or may be accessible from a displayed call graph in order to aid the developer in attributing root causes of possible performance regressions. Additionally, updating the call graph in accordance with one or more call graph operations as described herein may reduce cognitive overload and enable quick insights into application performance.

The systems and methods described herein may therefore significantly improve the accuracy and efficiency of identification of application performance regressions. They may also significantly improve attribution of root causes of identified application performance regressions, and may enable developers to quickly remedy such regressions, leading to rapid improvements in application quality.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive a set of control performance values and/or a set of modified performance values to be transformed, transform the control performance values and/or modified performance values, output a result of the transformation to determine a set of comparative performance values, use the result of the transformation to generate and/or weight a call graph based on the set of comparative performance values, and store the result of the transformation to display the weighted call graph via a user interface. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   receiving:
     a set of control performance values, each control performance value in the set of control performance values corresponding to a function called during an execution of an evaluation operation by a control version of a program; and
     a set of modified performance values, each modified performance value in the set of modified performance values corresponding to a function called during an execution of an evaluation operation by a modified version of a program;
   determining a set of comparative performance values based on the set of control performance values and the set of modified performance values, each comparative performance value in the set of comparative performance values representative of a variation in performance of a function during the execution of the evaluation operation by the control version of the program and the execution of the evaluation operation by the modified version of the program;
   generating a call graph based on the set of comparative performance values, the call graph comprising:
     a set of nodes, each node in the set of nodes corresponding to a function, the function corresponding to a particular comparative performance value included in the set of comparative performance values; and
     a set of edges, each edge in the set of edges directed from a node in the set of nodes corresponding to a caller function to a node in the set of nodes corresponding to a callee function called by the caller function;
   weighting each node in the set of nodes in accordance with the comparative performance value corresponding to the node; and
   displaying the call graph via a user interface in accordance with the weighting of each node in the set of nodes.

2. The method of claim 1, wherein weighting each node in the set of nodes in accordance with the comparative performance value corresponding to the node comprises:
   establishing a diverging color scheme based on a midpoint comparative performance value; and
   for each node in the set of nodes, assigning a display color included in the diverging color scheme to the node such that the display color assigned to the node reflects a relationship between the comparative performance value corresponding to the node and the midpoint comparative performance value.

3. The method of claim 2, wherein the midpoint comparative performance value represents a comparative performance value having less than a predetermined maximum threshold value and greater than a predetermined minimum threshold value.

4. The method of claim 1, further comprising:
   for each edge in the set of edges, determining a proportional performance value associated with a proportion of the comparative performance value associated with the node of the caller function attributable to the callee function; and
   weighting each edge in the set of edges in accordance with the proportional performance value of the edge;

wherein displaying the call graph via the user interface further comprises displaying the call graph via the user interface in accordance with the weighting of each edge in the set of edges.

5. The method of claim 1, further comprising:
receiving a direction to update the call graph in accordance with a call graph operation; and
updating the call graph in accordance with the call graph operation.

6. The method of claim 5, wherein:
the call graph operation comprises a hide operation;
the direction to update the call graph comprises a selection of at least one node included in the displayed call graph; and
updating the call graph comprises removing the at least one node from the displayed call graph.

7. The method of claim 5, wherein:
the call graph operation comprises a remove operation;
the direction to update the call graph comprises a selection of at least one node included in the displayed call graph; and
updating the call graph comprises:
removing the at least one node from the set of nodes; and
updating the comparative performance values corresponding to the nodes in the set of nodes and the edges in the set of edges based on removing the at least one node from the set of nodes.

8. The method of claim 5, wherein:
the call graph operation comprises a focus operation;
the direction to update the call graph comprises:
a selection of at least one node included in the displayed call graph; and
a length of a path from the selected node; and
updating the call graph comprises:
determining:
a reachable subset of nodes, the reachable subset of nodes comprising a subset of the set of nodes that are reachable from the selected node within the length of the path; and
an unreachable subset of nodes, the unreachable subset comprising a subset of the set of nodes that are not reachable from the selected node within the length of the path; and
removing the nodes included in the unreachable subset of nodes from the displayed call graph.

9. The method of claim 5, wherein:
the call graph operation comprises a merge operation;
the direction to update the call graph comprises a selection of at least two nodes included in the set of nodes; and
updating the call graph comprises replacing the at least two nodes with a merged node.

10. The method of claim 9, wherein replacing the at least two nodes with the merged node comprises:
determining a merged comparative performance value based on the comparative performance values corresponding to the at least two nodes;
designating the determined merged comparative performance value as the comparative performance value corresponding to the merged node;
removing the at least two nodes from the set of nodes;
including the merged node in the set of nodes; and
updating the comparative performance values corresponding to each node included in the set of nodes and the set of edges based on removing the at least two nodes from the set of nodes and including the merged node in the set of nodes.

11. The method of claim 1, wherein displaying the call graph further comprises:
receiving a direction to identify at least one node included in the set of nodes that corresponds to a function that has a predefined attribute;
identifying at least one node included in the set of nodes that corresponds to a function that has the predefined attribute; and
annotating the identified at least one node to indicate that the identified at least one node corresponds to a function that has the predefined attribute.

12. The method of claim 11, wherein the predefined attribute comprises an indication that:
the modified version of the program includes a modification to the function; and
the modification is omitted from the control version of the program.

13. The method of claim 12, further comprising:
receiving a direction to view information associated with the modification; and
displaying information regarding the modification via the user interface.

14. A system comprising:
a receiving module, stored in memory, that receives:
a set of control performance values, each control performance value in the set of control performance values corresponding to a function called during an execution of an evaluation operation by a control version of a program; and
a set of modified performance values, each modified performance value in the set of modified performance values corresponding to a function called during an execution of an evaluation operation by a modified version of a program;
a determining module, stored in memory, that determines a set of comparative performance values based on the set of control performance values and the set of modified performance values, each comparative performance value in the set of comparative performance values representative of a variation in performance of a function during the execution of the evaluation operation by the control version of the program and the execution of the evaluation operation by the modified version of the program;
a generating module, stored in memory, that generates a call graph based on the set of comparative performance values, the call graph comprising:
a set of nodes, each node in the set of nodes corresponding to a function, the function corresponding to a particular comparative performance value included in the set of comparative performance values; and
a set of edges, each edge in the set of edges directed from a node in the set of nodes corresponding to a caller function to a node in the set of nodes corresponding to a callee function called by the caller function;
a weighting module, stored in memory, that weights each node in the set of nodes in accordance with the comparative performance value corresponding to the node; and
a displaying module, stored in memory, that displays the call graph via a user interface in accordance with the weighting of each node in the set of nodes; and
at least one physical processor that executes the receiving module, the determining module, the generating module, the weighting module, and the displaying module.

15. The system of claim 14, wherein the weighting module weights each node in the set of nodes in accordance with the comparative performance value by:
- establishing a diverging color scheme based on a midpoint comparative performance value; and
- for each node in the set of nodes, assigning a display color included in the diverging color scheme to the node such that the display color assigned to the node reflects a relationship between the comparative performance value corresponding to the node and the midpoint comparative performance value.

16. The system of claim 14, wherein:
the receiving module further receives a direction to update the call graph in accordance with a call graph operation;
the system further comprises an updating module, stored in memory, that updates the call graph in accordance with the call graph operation; and
the at least one physical processor further executes the updating module.

17. The system of claim 16, wherein:
the call graph operation comprises at least one of:
a hide operation; and
a remove operation;
the direction to update the call graph comprises a selection of at least one node included in the displayed call graph; and
when the call graph operation comprises the hide operation, the updating module updates the call graph by removing the at least one node from the displayed call graph; and
when the call graph operation comprises the remove operation, the updating module updates the call graph by:
removing the at least one node from the set of nodes; and
updating the comparative performance values corresponding to the nodes in the set of nodes and the edges in the set of edges based on removing the at least one node from the set of nodes.

18. The system of claim 16, wherein:
the call graph operation comprises a focus operation;
the direction to update the call graph comprises:
a selection of at least one node included in the displayed call graph; and
a length of a path from the selected node; and
the updating module updates the call graph by:
determining:
a reachable subset of nodes, the reachable subset of nodes comprising a subset of the set of nodes that are reachable from the selected node within the length of the path; and
an unreachable subset of nodes, the unreachable subset comprising a subset of the set of nodes that are not reachable from the selected node within the length of the path; and
removing the nodes included in the unreachable subset of nodes from the displayed call graph.

19. The system of claim 16, wherein:
the call graph operation comprises a merge operation;
the direction to update the call graph comprises a selection of at least two nodes included in the set of nodes; and
the updating module updates the call graph by replacing the at least two nodes with a merged node by:
determining a sum of the comparative performance values corresponding to the at least two nodes;
designating the determined sum as the comparative performance value corresponding to the merged node;
removing the at least two nodes from the set of nodes;
including the merged node in the set of nodes; and
updating the comparative performance values corresponding to each node included in the set of nodes and the set of edges based on removing the at least two nodes from the set of nodes and including the merged node in the set of nodes.

20. A non-transitory computer-readable medium comprising instructions that, when executed by at least one processor of a computing system, cause the computing system to:
receive:
a set of control performance values, each control performance value in the set of control performance values corresponding to a function called during an execution of an evaluation operation by a control version of a program; and
a set of modified performance values, each modified performance value in the set of modified performance values corresponding to a function called during an execution of an evaluation operation by a modified version of a program;
determine a set of comparative performance values based on the set of control performance values and the set of modified performance values, each comparative performance value in the set of comparative performance values representative of a variation in performance of a function during the execution of the evaluation operation by the control version of the program and the execution of the evaluation operation by the modified version of the program;
generate a call graph based on the set of comparative performance values, the call graph comprising:
a set of nodes, each node in the set of nodes corresponding to a function, the function corresponding to a particular comparative performance value included in the set of comparative performance values; and
a set of edges, each edge in the set of edges directed from a node in the set of nodes corresponding to a caller function to a node in the set of nodes corresponding to a callee function called by the caller function;
weight each node in the set of nodes in accordance with the comparative performance value corresponding to the node; and
display the call graph via a user interface in accordance with the weighting of each node in the set of nodes.

* * * * *